(12) United States Patent
Pai et al.

(10) Patent No.: US 9,304,146 B2
(45) Date of Patent: Apr. 5, 2016

(54) RADIO-FREQUENCY REFLECTOMETRY SCANNING TUNNELING MICROSCOPE

(71) Applicant: National Taiwan University, Taipei (TW)

(72) Inventors: Woei-Wu Pai, Taipei (TW); Huan-Hsin Li, New Taipei (TW); I-Jan Chen, Taipei (TW); Yen-Cheng Chao, Taoyuan (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 0 days.

(21) Appl. No.: 14/490,812

(22) Filed: Sep. 19, 2014

(65) Prior Publication Data

US 2015/0026847 A1 Jan. 22, 2015

Related U.S. Application Data

(63) Continuation-in-part of application No. 14/037,024, filed on Sep. 25, 2013, now Pat. No. 8,863,311.

(30) Foreign Application Priority Data

Jul. 18, 2013 (TW) .............................. 102125746 A
Jul. 17, 2014 (TW) .............................. 103124553 A

(51) Int. Cl.
*G01Q 60/16* (2010.01)
(52) U.S. Cl.
CPC ..................................... *G01Q 60/16* (2013.01)
(58) Field of Classification Search
CPC ...................................................... G01Q 60/16
USPC .......................................................... 850/21
See application file for complete search history.

(56) References Cited

U.S. PATENT DOCUMENTS

| 4,343,993 | A | * | 8/1982 | Binnig | ................... | B82Y 35/00 |
| | | | | | | 250/423 F |
| 7,451,646 | B2 | * | 11/2008 | Cleland | ................... | B82Y 35/00 |
| | | | | | | 324/658 |
| 8,863,311 | B1 | * | 10/2014 | Pai et al. | .......................... | 850/29 |
| 2007/0194225 | A1 | * | 8/2007 | Zorn | ...................... | B82Y 35/00 |
| | | | | | | 250/306 |
| 2015/0067931 | A1 | * | 3/2015 | Hagmann | .............. | G01Q 30/20 |
| | | | | | | 850/18 |

FOREIGN PATENT DOCUMENTS

DE 102 59 118 A1 5/2004
JP 2012-181015 A 9/2012

OTHER PUBLICATIONS

Kemiktarak et al., "Radio-frequency scanning tunnelling microscopy", Nature Publishing Group, vol. 450, pp. 1-5, Nov. 1, 2007.

* cited by examiner

*Primary Examiner* — Phillip A Johnston
(74) *Attorney, Agent, or Firm* — Birch, Stewart, Kolasch & Birch, LLP

(57) ABSTRACT

An RF reflectometry scanning tunneling microscope is suitable for observing a surface of an object, and includes a probe that cooperates with the object to form a tunneling resistor therebetween, an RF resonant circuit that cooperates with the tunneling resistor to form a LCR resonant circuit including an inductor connected to a parallel connection of a capacitor, a resistor and the tunneling resistor, a directional coupler receiving an RF signal and outputting the RF signal to the LCR resonant circuit, and an RF signal measuring device that generates a scanning result associated with the surface of the object based on a reflected RF signal resulting from reflection of the RF signal by the LCR resonant circuit.

19 Claims, 23 Drawing Sheets

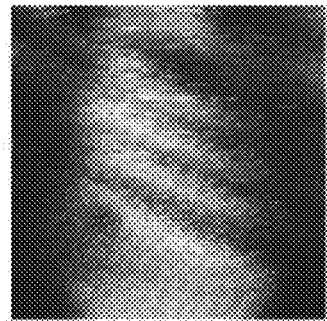 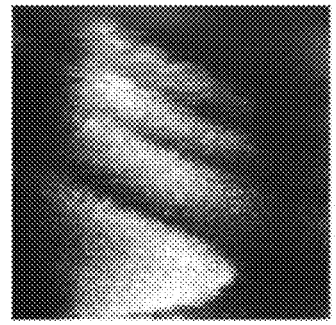
FIG.37(a)　　FIG.37(b)
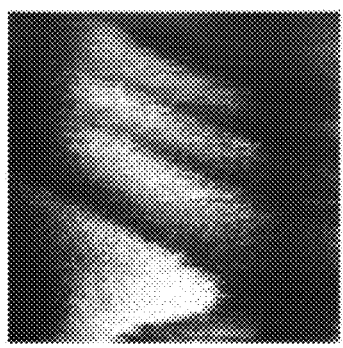 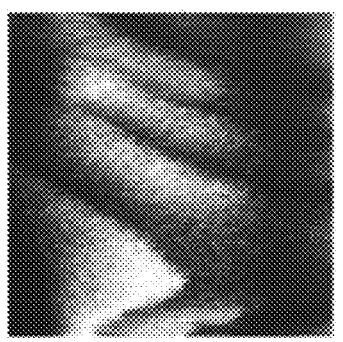 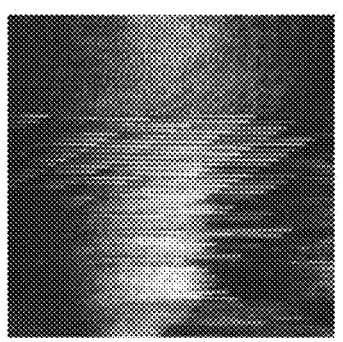
FIG.37(c)　　FIG.37(d)　　FIG.37(e)

US 9,304,146 B2

RADIO-FREQUENCY REFLECTOMETRY SCANNING TUNNELING MICROSCOPE

CROSS-REFERENCE TO RELATED APPLICATION

This application claims priority of Taiwanese Patent Application No. 103124553, filed on Jul. 17, 2014, and is a Continuation-in-Part of U.S. patent application Ser. No. 14/037,024 which is filed on Sep. 25, 2013 and which claims Taiwanese Patent Application No. 102125746, filed on Jul. 18, 2013.

BACKGROUND OF THE INVENTION

1. Field of the Invention

The invention relates to a tunneling microscope, more particularly to a radio-frequency reflectometry scanning tunneling microscope.

2. Description of the Related Art

There are two kinds of scanning operations of a conventional tunneling microscope, i.e., a constant height mode which is illustrated in FIG. 1, and a constant current mode which is illustrated in FIG. 2.

Referring to FIG. 3, a current-to-voltage converter 11 adopted in the conventional tunneling microscope is illustrated. The current-to-voltage converter 11 amplifies and converts the tunneling current $I_t$ into a voltage $V_{out}$, and outputs the voltage $V_{out}$ to the scanning control circuit 12. The scanning control circuit 12 controls the altitude of the probe based on the voltage $V_{out}$. A gain of the current-to-voltage converter 11 is decided by a feedback resistor $R_{FB}$ therein. Since the amplitude of the tunneling current $I_t$ is very small (pico-amp to nano-amp scale), in practice, the feedback resistor $R_{FB}$ is set at 100 M Ohms or larger. Moreover, since an intrinsic capacitor $C_{FB}$ of the current-to-voltage converter 11 is usually of picofarad scale, a time constant $R_{FB} \times C_{FB}$ attributed to the feedback resistor $R_{FB}$ and the intrinsic capacitor $C_{FB}$ limits a frequency of the voltage $V_{out}$ to about tens of kilohertz, such that the current-to-voltage converter 11 is limited to operate at no more than hundreds of kilohertz. This limitation causes the conventional tunneling microscope to be suitable only for observing physical and chemical phenomena that are static or dynamic but with relatively slow evolution.

Moreover, the conventional tunneling microscope is limited to the following conditions when in use. First, the object 20 to be scanned is required to be an electrically conductive material. Second, the conventional tunneling microscope which is operating in the constant current mode is vulnerable to interference resulting from different kinds of external electron/current sources. The external electron/current sources are selected from the group consisting of incident electrons emitted by an electron gun, secondary electrons, Auger electrons, photoelectrons excited by radiation, ionic current, and combinations thereof. If an external current resulting from the electron/current sources enters or passes by a vicinity of a tunneling barrier, the external current resulting from the electron/current sources together with the tunneling current $I_t$ would be amplified by the current-to-voltage converter 11, thereby adversely influencing the aforementioned feedback control mechanism, so that the scanning result of the surface of the object 20 may not be obtained properly.

Accordingly, in order to overcome the aforementioned issue that the operating bandwidth of the tunneling microscope is limited, a radio-frequency (RF) scanning tunneling microscope has been proposed by Kemiktarak et al., and a circuit diagram thereof is illustrated in FIG. 4. Referring to FIG. 4, a right-hand side of a circuit of the RF scanning tunneling microscope shows that a similar circuit structure of the conventional tunneling microscope is adopted. That is to say, the tunneling current $I_t$ generated between the probe 10 and the object 20 is outputted, via an inductor L having one end coupled electrically to the probe 10 and via a bias tee circuit 13 coupled electrically to another end of the inductor L, to the current-to-voltage converter 11. The current-to-voltage converter 11 amplifies and converts the tunneling current $I_t$, and then outputs the tunneling current $I_t$ thus amplified and converted to the scanning control circuit 12, so as to control the altitude of the probe 10. The scanning control circuit 12 further depicts the surface of the object 20 based on the tunneling current $I_t$ outputted by the current-to-voltage converter 11. In addition, a left-hand side of the circuit of the RF scanning tunneling microscope is an RF scanning circuit. A grounding capacitor C is coupled electrically to said one end of the inductor L. The RF scanning circuit includes an RF source 14 outputting an RF signal via a directional coupler 15, via the bias tee circuit 13 that has two ports passing RF signals bi-directionally and a third port passing DC signal, and via the inductor L to the probe 10. The probe 10 cooperates with the object 20 to form a tunneling resistor $R_t$ therebetween, such that the inductor L is connected in series with a parallel connection of the tunneling resistor $R_t$ and the capacitor C, so as to form an L-leg low pass LCR resonant circuit. An equivalent circuit of the L-leg low pass LCR resonant circuit is illustrated in FIG. 5, and a resonant frequency thereof is defined by $$\omega_{LC} = \sqrt{\frac{1}{LC}\left(1 - \frac{L}{CR_t^2}\right)},$$

where $\omega_{LC}$ represents an angular frequency associated with the resonant frequency, L represents inductance of the inductor L, C represents capacitance of the capacitor C, and $R_t$ represents resistance of the tunneling resistor $R_t$, i.e., a tunneling barrier.

It is evident from the abovementioned function that the resonant frequency is substantially determined after the inductance of the inductor L and the capacitance of the capacitor C have been decided. Resistance of the tunneling resistor $R_t$ is adjusted according to $$R_t \approx \frac{L}{C \times Z_o},$$

where $Z_o$ represents output impedance of the RF scanning circuit that outputs the RF signal to the L-leg low pass LCR resonant circuit, such that impedance $Z_t$ of the L-leg low pass LCR resonant circuit corresponds to the output impedance $Z_o$, so as to achieve optimum impedance matching. At this time, the L-leg low pass LCR resonant circuit may obtain substantially the maximum power of the RF signal (i.e., maximum power transfer).

Referring to FIG. 6, when the resistance of the tunneling resistor $R_t$ is adjusted to 0.15M Ohms, a relatively good impedance matching may be achieved, and return loss is 45 dB. If the probe 10 is moved away from the object 20 along the Z-axis, resistance of the tunneling resistor $R_t$ increases. At the same time, since the impedance $Z_t$ of the L-leg low pass LCR resonant circuit does not match with the output impedance $Z_O$, power of a reflected RF signal resulting from reflection of the RF signal by the L-leg low pass LCR resonant circuit also increases. FIG. 6 illustrates the phenomena where a reflection coefficient for the L-leg low pass LCR resonant circuit increases rapidly (i.e., the return loss decreases) while the resistance of the tunneling resistor $R_t$ increases. Further, it is evident from FIG. 6 that when the resistance of the tunneling resistor $R_t$ changes from 0.15M ohms to 0.4M ohms, the return loss changes from 45 db to 15 dB. When the resistance of the tunneling resistor $R_t$ is equal to 1M ohms, the return loss is 12 dB. When the resistance of the tunneling resistor $R_t$ ranges from 10M ohms to 1G ohms, the return loss is kept at around 11 dB, and variation of the return loss is so subtle that, in practice, it is hard to distinguish the differences between the return loss while the resistance of the tunneling resistor $R_t$ is set at around 10M ohms and at around 100M ohms. Moreover, in practical applications, the resistance of the tunneling resistor $R_t$ usually ranges from 10M ohms to 1 G ohms, so that the return loss is hardly utilized for obtaining actual resistance of the tunneling resistor $R_t$ by means of the aforementioned RF scanning tunneling microscope.

It is evident from FIG. 7 that a relationship between the return loss and the resistance of the tunneling resistor $R_t$ is a non-monotonic function. That is, the same return loss may correspond to two different resistances of the tunneling resistor $R_t$. The non-monotonic relationship may cause misjudgment of the scanning result made by the scanning control circuit 12, and instability may arise when control of the altitude of the probe 10 is based on the return loss.

SUMMARY OF THE INVENTION

Therefore, an object of the present invention is to provide a radio-frequency (RF) reflectometry scanning tunneling microscope which provides a monotonic relationship between magnitude of a reflection coefficient and resistance of a tunneling resistor, and which is capable of operating in a relatively high frequency band compared to the conventional tunneling microscope and is capable of operating in a condition corresponding to a usual resistance range of the tunneling resistor (i.e., 10M ohms to 1 G ohms).

Accordingly, the RF reflectometry scanning tunneling microscope of this invention is suitable for observing a surface of an object, and comprises a probe, an RF resonant circuit, a directional coupler, and an RF signal measuring device. The probe is adapted to be positioned relative to the surface of the object, and to interact with the object to form a tunneling resistor therebetween. The RF resonant circuit includes an inductor that has a first end connected to the probe, a capacitor that is connected to the first end of the inductor, and a resistor that is connected in parallel with the capacitor. The RF resonant circuit is to cooperate with the tunneling resistor to form a LCR resonant circuit in which the inductor is connected to a parallel connection of a capacitor, a resistor and the tunneling resistor. The directional coupler is coupled electrically to a second end of the inductor of the RF resonant circuit, and is configured to receive an RF signal, to output the RF signal thus received to the LCR resonant circuit, and to receive a reflected RF signal that results from reflection of the RF signal by the LCR resonant circuit. The RF signal measuring device is adapted to receive the reflected RF signal from the LCR resonant circuit via the directional coupler, and is operable to generate a scanning result associated with the surface of the object based on the reflected RF signal.

The present invention, by utilizing the reflected RF signal, is capable of measuring the tunneling effect that occurs between the probe and the object. Moreover, the present invention is further capable of measuring the reactance effect on the surface of the object through the RF signal measuring device. In addition, the present invention may be alleviated from interference of external electron/current sources, so as to obtain a clear and uninfluenced scanning result of the surface of the object.

BRIEF DESCRIPTION OF THE DRAWINGS

Other features and advantages of the present invention will become apparent in the following detailed description of three embodiments with reference to the accompanying drawings, of which:

FIG. 37(a) is an image of an area on the surface of the object obtained through the second embodiment which operates under the constant current mode without interference of an external current;

FIG. 37(b) is an image of the area on the surface of the object obtained through the second embodiment which operates under the constant RF reflection magnitude mode with the presence of an external current;

FIG. 37(c) is an image of an area on the surface of the object obtained through the second embodiment which operates under the constant RF reflection magnitude mode without interference of an external current;

FIG. 37(d) is an image of the area on the surface of the object obtained through the second embodiment which operates under the constant RF reflection magnitude mode with the presence of an external current;

FIG. 37(e) is an image of the area on the surface of the object obtained through the second embodiment which operates under the constant current mode with the presence of an external current.

DETAILED DESCRIPTION OF THE EMBODIMENTS

Figure 8:
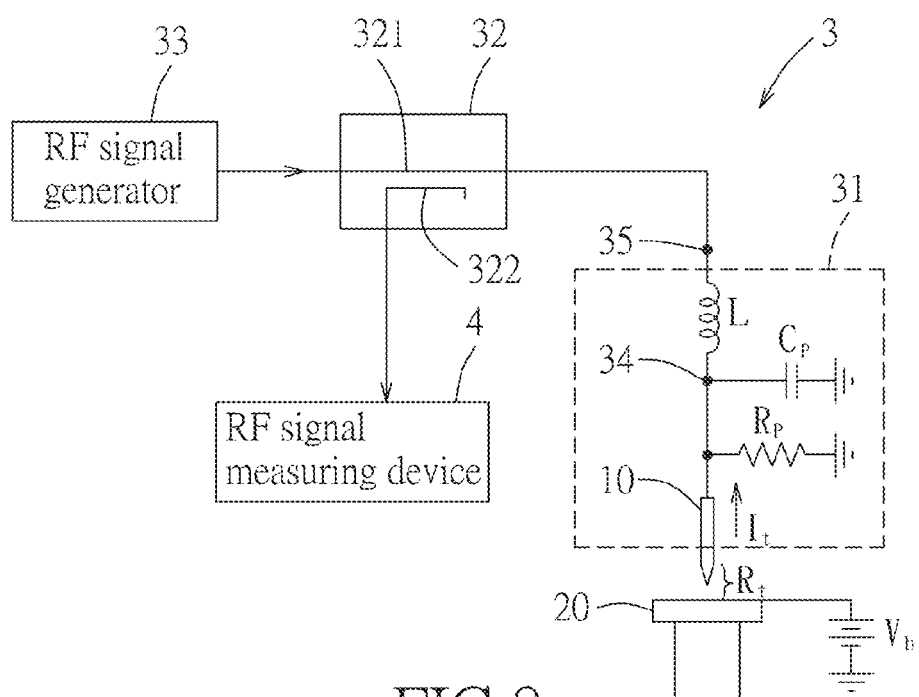
FIG. 8 is a circuit diagram illustrating a LCR resonant circuit of a first embodiment of an RF scanning tunneling microscope according to the present invention.
Figure 9:
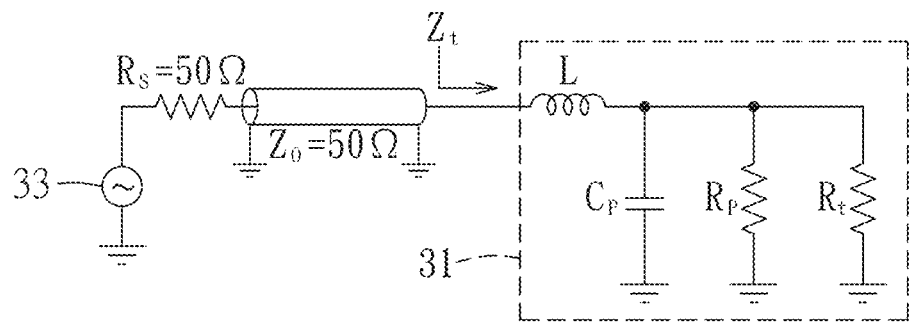
FIG. 9 is a circuit diagram illustrating an equivalent circuit of the LCR resonant circuit of the first embodiment.

Referring to FIG. 8, a first embodiment of a radio-frequency (RF) scanning tunneling microscope 3 according to the present invention is suitable for observing a surface of an object 20, and comprises a probe 10 which is adapted to be positioned relative to the surface of the object 20, and to interact with the object 20 to form a tunneling resistor $R_t$ therebetween. The RF scanning tunneling microscope 3 further comprises an RF resonant circuit 31, a first directional coupler 32, an RF signal generator 33 and an RF signal measuring device 4. The RF resonant circuit 31 includes an inductor L that has a first end 34 connected to the probe 10, and a second end 35, a capacitor $C_p$ connected to the first end 34 of the inductor L, and a resistor $R_p$ connected in parallel with the capacitor $C_p$. The RF resonant circuit 31 is to cooperate with the tunneling resistor $R_t$ to form a LCR resonant circuit in which the inductor L is connected to a parallel connection of the capacitor $C_p$, the resistor $R_p$ and the tunneling resistor $R_t$. An equivalent circuit of the LCR resonant circuit is illustrated in FIG. 9.

A bias voltage may be applied between the probe 10 and the object 20. For example, the object 20 is applied with a bias voltage $V_b$ and the probe 10 is grounded. When the probe 10 is positioned sufficiently close to the surface of the object 20, the tunneling effect occurs so as to result in the tunneling resistor $R_t$ therebetween.

In a pre-tuning stage, inductance of the inductor L, capacitance of the capacitor $C_p$ and resistance of the resistor $R_p$ are adjusted in advance such that the LCR resonant circuit resonates at a resonant frequency, which is defined by:

$$\omega_{LC} = \sqrt{\frac{1}{LC}\left(1 - \frac{L}{CR^2}\right)},$$

where $\omega_{LC}$ represents an angular frequency associated with the resonant frequency, L represents inductance of the inductor L, C represents capacitance of the capacitor $C_p$, and R represents resistance of the resistor $R_p$.

In practice, since resistance of the tunneling resistor $R_t$ is substantially of megaohm to gigaohm scale, and since the resistance of the resistor $R_p$ is substantially of kiloohm scale, resistance of the tunneling resistor $R_t$ is much larger than that of the resistor $R_p$, i.e., $R_t \gg R_p$. When the resistance of the tunneling resistor $R_t$ is substantially infinite (i.e., the probe 10 is kept away from the object 20), the resistance $R_{||}$ of a parallel connection of the resistor $R_p$ and the tunneling resistor $R_t$ (i.e., $R_{||}=R_t//R_p$) is very close to the resistance of the resistor $R_p$, i.e., $R \approx R_p$. Therefore, the resonant frequency of the LCR resonant circuit is determined in a condition that the LCR resonant circuit may achieve optimum impedance matching when the probe 10 is kept away from the object 20, i.e., $R=R_p$. That is to say, impedance of the LCR resonant circuit $Z_t$ corresponds to output impedance $Z_o$ (50 ohms), and a reflection coefficient $\Gamma$ for the LCR resonant circuit is minimum. When the probe 10 is moved to approach the object 20 so that the resistance of the tunneling resistor $R_t$ decreases to a finite value, the resistance $R_{||}$ of said parallel connection is substantially equal to but smaller than the resistance of the resistor $R_p$. The LCR resonant circuit thus fails to achieve impedance matching such that the reflection coefficient $\Gamma$ changes. In this way, variations of the reflection coefficient $\Gamma$ are decided by the impedance of the LCR resonant circuit $Z_t$, i.e., $$Z_t = \frac{L}{C \times R}.$$

When the resistance R of said parallel connection is subtly changed, the impedance $Z_t$ is also subtly changed, such that the reflection coefficient $\Gamma$ is further subtly changed.

Figure 1:
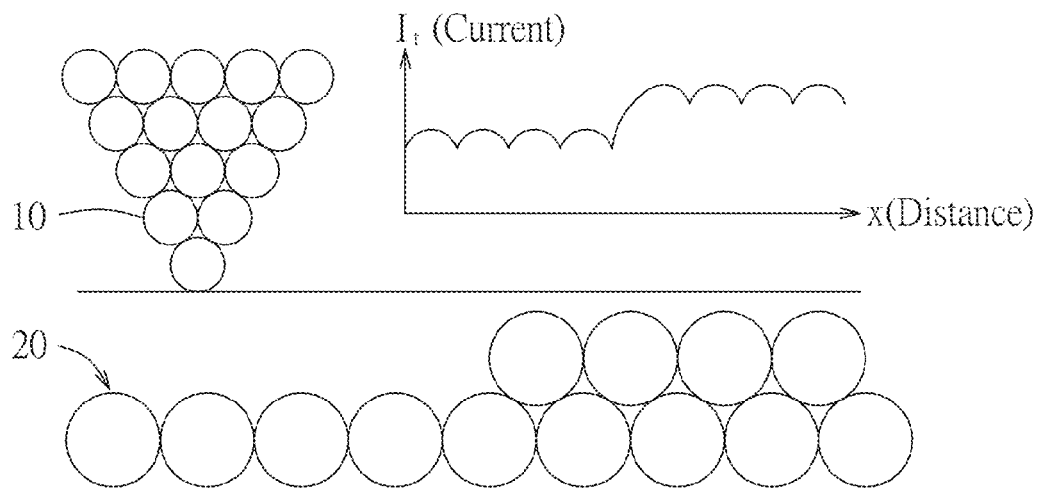
FIG. 1 is a schematic diagram illustrating a conventional scanning tunneling microscope that operates in a constant height mode.
Figure 2:
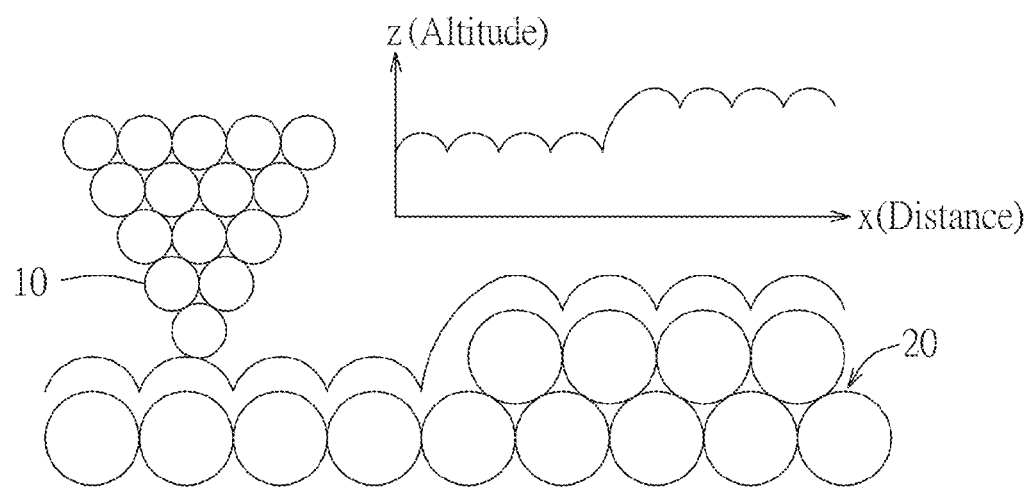
FIG. 2 is a schematic diagram illustrating the conventional scanning tunneling microscope that operates in a constant current mode.
Figure 3:
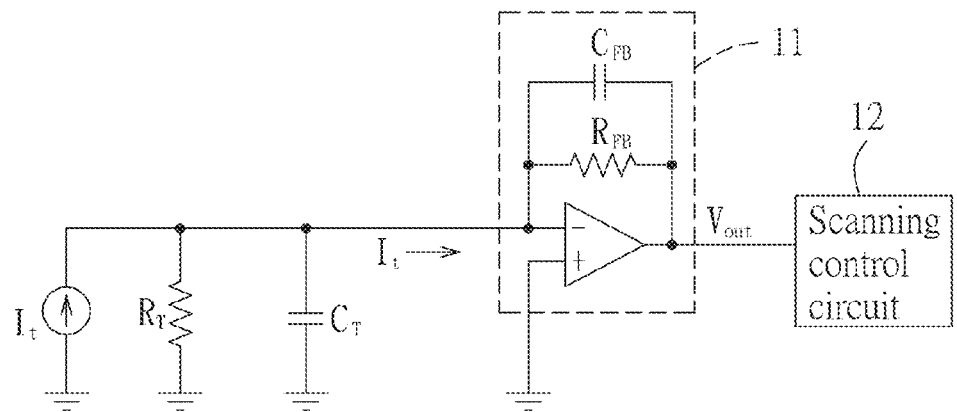
FIG. 3 is a circuit diagram illustrating a current-to-voltage converter adopted in the conventional scanning tunneling microscope.
Figure 4:
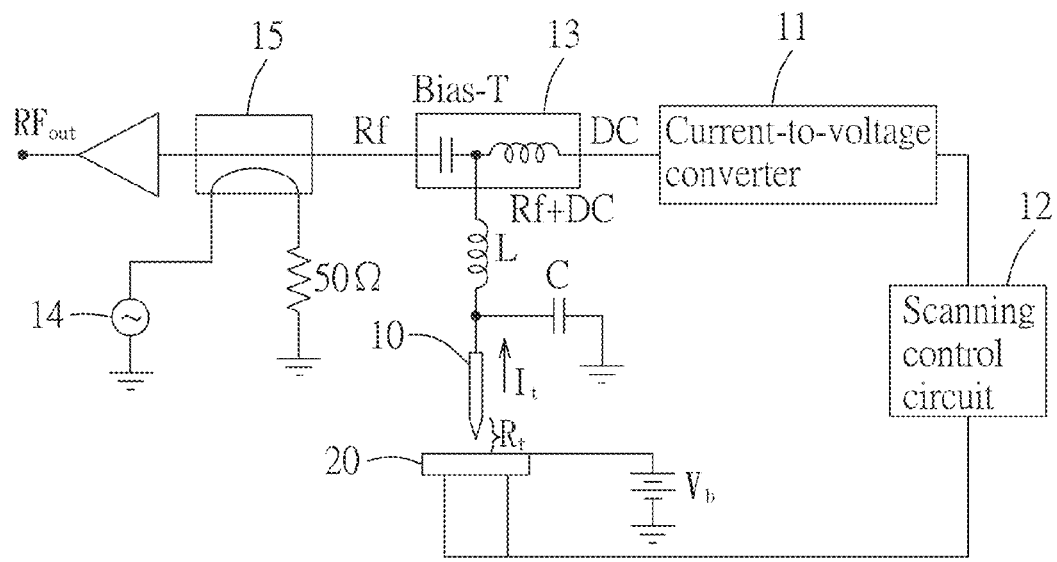
FIG. 4 is a circuit diagram illustrating a conventional radio-frequency (RF) scanning tunneling microscope.
Figure 5:
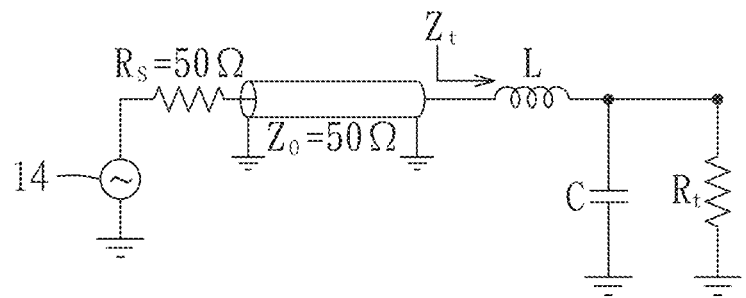
FIG. 5 is a circuit diagram illustrating an equivalent circuit of an L-leg low pass LCR resonant circuit of the conventional RF scanning tunneling microscope.
Figure 6:
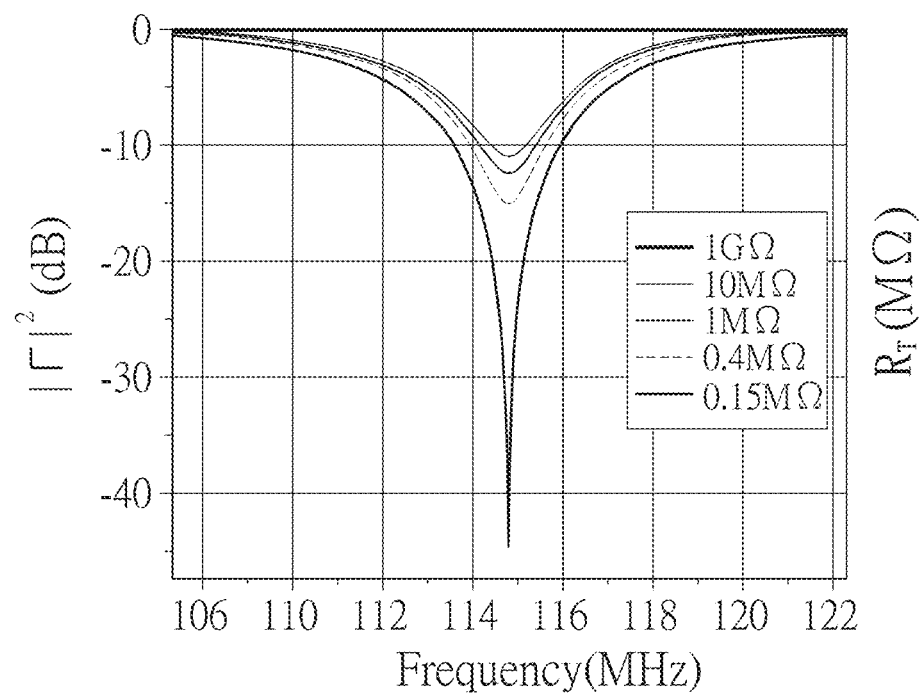
FIG. 6 illustrates relationships between return loss and frequency corresponding to different resistances of a tunneling resistor.
Figure 7:
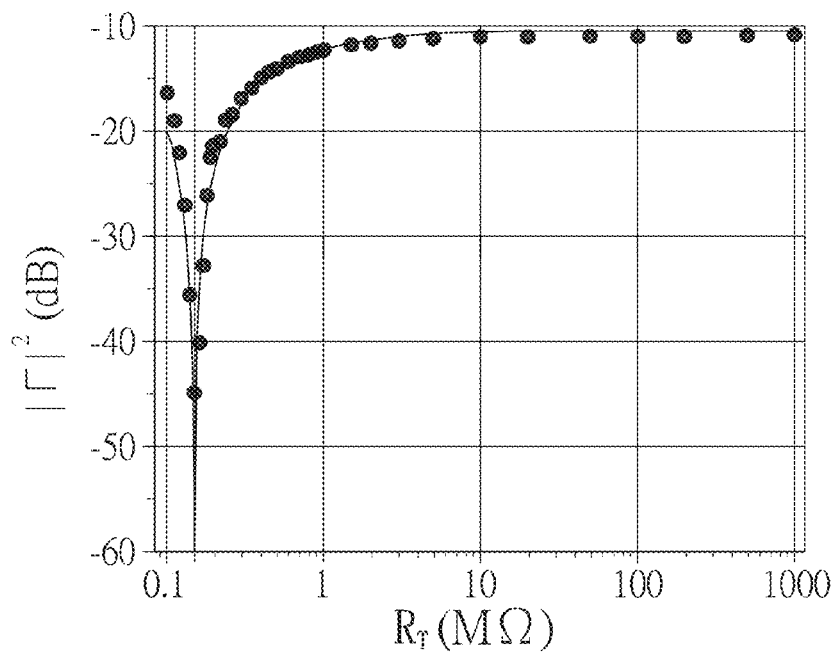
FIG. 7 illustrates that a relationship between the return loss obtained by the conventional RF scanning tunneling microscope and the resistance of the tunneling resistor is a non-monotonic function.
Figure 10:
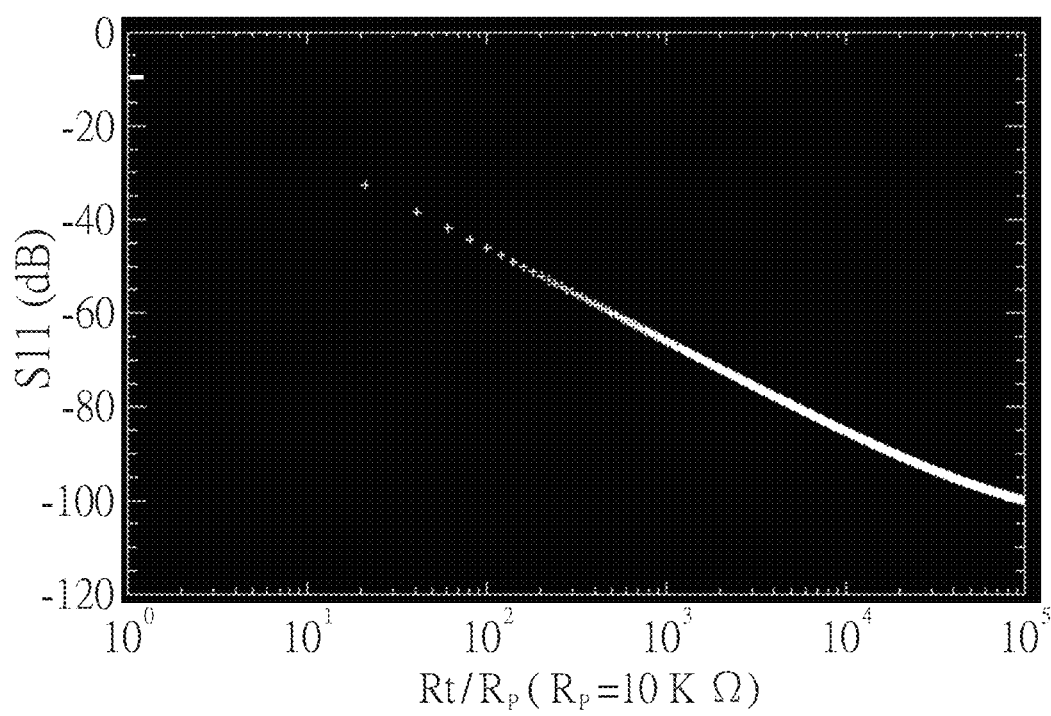
FIG. 10 is a log-log plot illustrating a relationship between the reflection coefficient and a division of the resistance of the tunneling resistor $R_t$ by the resistance of the resistor $R_p$.

A relationship between the reflection coefficient $\Gamma$ and a division of the resistance of the tunneling resistor $R_t$ by the resistance of the resistor $R_p$ is illustrated in a log-log plot as shown in FIG. 10, in which the reflection coefficient $\Gamma$ (i.e., the S-parameter $S_{11}$) is varied according to variation of the resistance of the tunneling resistor $R_t$. Within a relatively large range of the resistance of the tunneling resistor $R_t$ compared with that shown in FIG. 7, the variation of the reflection coefficient $\Gamma$ with respect to the resistance of the tunneling resistor $R_t$ represents a substantially monotonic and linear configuration. Therefore, the issues of misjudgment of the scanning result and unstable feedback control which usually happen in a conventional RF scanning tunneling microscope resulting from the non-monotonic and nonlinear relationship between the return loss and the resistance of the tunneling resistor may be overcome.

Referring once again to FIG. 8, the first directional coupler 32 is coupled electrically to the second end 35 of the inductor L of the RF resonant circuit 31, and has a main path 321 and a coupling path 322. The RF signal generator 33 is coupled electrically to the first directional coupler 32, is operable to generate an RF signal, and is adapted to output the RF signal via the main path 321 of the first directional coupler 32 to the LCR resonant circuit. The RF signal is reflected by the LCR resonant circuit so as to result in a reflected RF signal. The reflected RF signal is transmitted via the coupling path 322 of the first directional coupler 32 to the RF signal measuring device 4 which is coupled electrically to the first directional coupler 32. The RF signal measuring device 4 is adapted to receive from the LCR resonant circuit via the coupling path 322 of the first directional coupler 32 the reflected RF signal, and generates a scanning result associated with the surface of the object 20 based on the reflected RF signal. The RF signal measuring device 4 may also adjust an altitude of the probe 10 with respect to the surface of the object 20 based on the reflected RF signal (i.e., feedback control).

If a return loss of the LCR resonant circuit is desired to be maintained above 20 dB, and if the LCR resonant circuit is desired to operate at a higher frequency (hundreds of megahertz), the inductance of the inductor L or the capacitance of the capacitor $C_p$ should be relatively small (referring to $$\omega_{LC} = \sqrt{\frac{1}{LC}\left(1 - \frac{L}{CR^2}\right)}$$

as described above). Moreover, the resistance of the resistor $R_p$ should be large enough since the variation of the reflection coefficient $\Gamma$ depends on a difference between the resistance of the resistor $R_p$ and the resistance $R_{||}$ of said parallel connection $R_t//R_p$. Therefore, the higher the resistance of the resistor $R_p$ is, the greater will be the variation of the reflection coefficient $\Gamma$. However, since the resistance of the resistor $R_p$ is substantially equal to $$R_p = \frac{L}{C \times Z_o},$$

the resistance of the resistor $R_p$ is hardly set at a higher value. Even if stray capacitance on a printed circuit board (<1.0 pF) is adopted to implement the capacitance of the capacitor $C_p$, it is still very difficult to set the resistance of the resistor $R_p$ above several kilo ohms.

Figure 11:
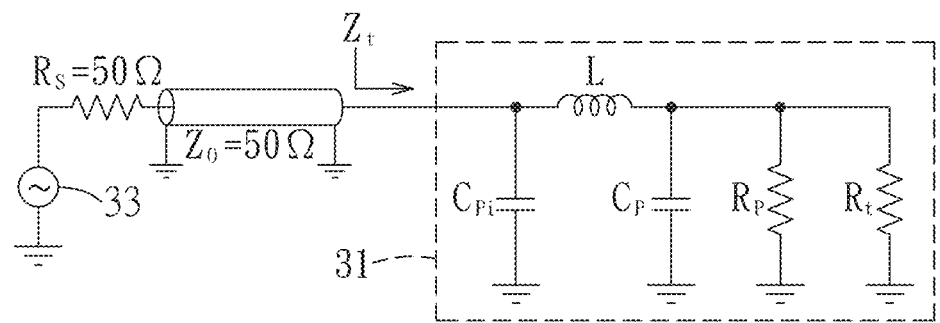
FIG. 11 is a circuit diagram illustrating that the RF resonant circuit further includes an auxiliary capacitor.

In order to overcome the aforementioned issue, referring to FIG. 11, the RF resonant circuit 31 may further include an auxiliary capacitor $C_{pi}$ that is connected to the second end 35 of the inductor L. The RF resonant circuit 31 is to cooperate with the tunneling resistor $R_t$ to form a $\pi$-type LCR resonant circuit. Capacitance of the auxiliary capacitor $C_{pi}$ is set at a higher value so that the resistance of the resistor $R_p$ may be set at a higher value. Since the resonant frequency is predominantly decided by the inductance of the inductor L and the capacitance of the capacitor $C_p$, after the resonant frequency and the resistance of the resistor $R_p$ are set, the capacitance of the auxiliary capacitor $C_{pi}$ may be determined (usually in a range from several picofarads to tens of picofarads). Moreover, since the resistance of the tunneling resistor $R_t$ usually ranges from tens of mega ohms to 1 G ohms, an upper limit of the resistance of the resistor $R_p$ may be set to about 100K ohms, such that the variation of the reflection coefficient $\Gamma$ with respect to the same resistance of the tunneling resistor $R_t$ may be greater by virtue of addition of the auxiliary capacitor $C_{pi}$.

Figure 12:
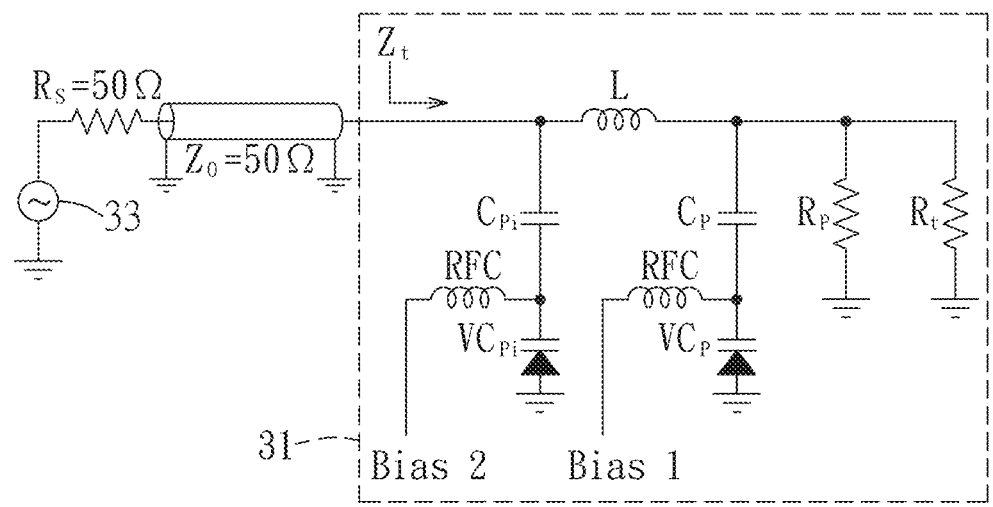
FIG. 12 is a circuit diagram illustrating that the RF resonant circuit further includes first and second voltage-controlled capacitors.

A structure of the $\pi$-type LCR resonant circuit also offers an opportunity to adjust the resonant frequency of the $\pi$-type LCR resonant circuit in real time. Since the resistance of the resistor $R_p$ is fixed, adjustment of the resonant frequency relies on adjustment of the capacitances of the capacitor $C_p$ and the auxiliary capacitor $C_{pi}$. Referring to FIG. 12, the RF resonant circuit 31 may further include a first voltage-controlled capacitor $VC_p$, and a second voltage-controlled capacitor $VC_{pi}$. The first voltage-controlled capacitor $VC_p$ is connected in series with the capacitor $C_p$ of the RF resonant circuit 31, and has a capacitance adjusted using a first bias voltage Bias1 to thereby adjust the resonant frequency at which the $\pi$-type LCR resonant circuit resonates. The second voltage-controlled capacitor $VC_{pi}$ is connected in series with the auxiliary capacitor $C_{pi}$ of the RF resonant circuit 31, and has a capacitance adjusted using a second bias voltage Bias2 to thereby adjust an impedance of the $\pi$-type LCR resonant circuit. In this way, the $\pi$-type LCR resonant circuit may be controlled to select, within a predetermined operating frequency range, a frequency of the RF signal that is to be measured, so as to attempt different types of physical measurements.

Figure 13:
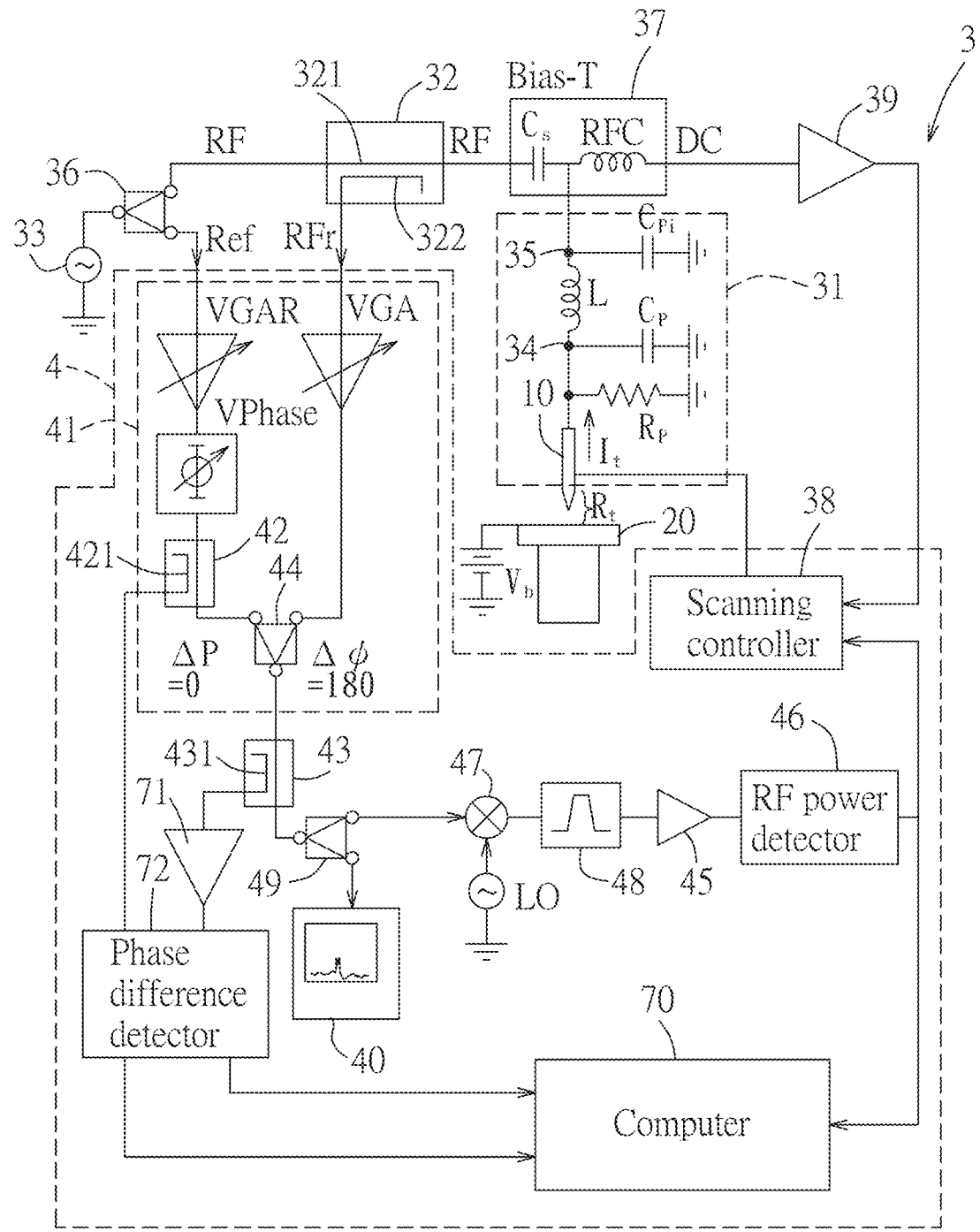
FIG. 13 is a circuit diagram illustrating the first embodiment of the RF reflectometry scanning tunneling microscope according to the present invention.

The RF signal measuring device 4, based on the reflected RF signal received from the first directional coupler 32, is operable to measure the variation of the reflection coefficient Γ (i.e., S11) of the π-type LCR resonant circuit with respect to the resistance of the tunneling resistor $R_t$. Since the first directional coupler 32 is non-ideal and the directivity thereof is finite (in practice, a directivity in a specified used frequency range of 20 to 30 dB or more is chosen), the reflected RF signal received at the RF signal measuring device 4 via the coupling path 322 (coupling loss is considered) is accompanied by a leaked component of the RF signal that is leaked from the main path 321 to the coupling path 322 while the RF signal is transmitted via the main path 321 of the first directional coupler 32 to the π-type LCR resonant circuit so as to result in a to-be-compensated combined signal RFr as best shown in FIG. 13. Further, when a magnitude of the RF signal transmitted via the main path 321 of the first directional coupler 32 to the π-type LCR resonant circuit is relatively large, a magnitude of the leaked component of the RF signal leaked from the main path 321 to the coupling path 322 may be even larger than a magnitude of the reflected RF signal. Aside from the reflected RF signal, the leaked component of the RF signal which may be regarded as a background signal is also transmitted to the RF signal measuring device 4, such that the variation of the reflected RF signal which is desired to be measured by the RF signal measuring device 4 is relatively subtle compared to the to-be-compensated signal RFr which is actually measured by the RF signal measuring device 4. The adverse influence of the leaked component of the RF signal hinders measurement of the variation of the reflected RF signal.

For example, the magnitude of the leaked component of the RF signal (i.e., the background signal) outputted from the first directional coupler 32 typically ranges from −20 dBm to −40 dBm. When atomic and nanoscale features of surface of the object 20 are to be observed, the variation of the reflected RF signal outputted from the π-type LCR resonant circuit may be 0.01 dB or even lower. Although the reflected RF signal may be amplified by an RF power amplifier with low noise and low distortion to have the magnitude of around −10 dBm, the variation of the reflected RF signal is still maintained at the same 0.01 dB. It is difficult for a modern power detector to directly detect a difference between −10.00 dBm and −10.01 dBm, or even smaller differences, since the noise level in the power detector may be approximate to or larger than this 0.01 dB variation.

In order to overcome the aforementioned issue, referring to FIG. 13, the RF reflectometry scanning tunneling microscope 3 of the present invention further comprises a 2-way power splitter 36 which has two output ports, which is coupled electrically to the RF signal generator 33, which splits the RF signal generated by the RF signal generator 33 into first and second RF signal parts, and which outputs the first and second RF signal parts to the first directional coupler 32 and the RF signal measuring device 4 via the output ports, respectively. The reflected RF signal received at the RF signal measuring device 4 via the first directional coupler 32 is accompanied by a leaked component of the first RF signal part which is outputted from the 2-way power splitter 36 and which passes through the first directional coupler 32. The leaked component of the first RF signal part is leaked from the main path 321 to the coupling path 322 of the first directional coupler 32. The RF signal measuring device 4 further includes an RF signal compensating circuit 41.

The RF signal compensating circuit 41 includes a first voltage-controlled gain amplifier VGA which is coupled electrically to the coupling path 322 of the first directional coupler 32, a second voltage-controlled gain amplifier VGAR which is coupled electrically to one of the output ports of the 2-way power splitter 36, and a phase shifter VPhase which is coupled electrically to the second voltage-controlled gain amplifier VGAR. The first voltage-controlled gain amplifier VGA amplifies the reflected RF signal received from the LCR resonant circuit via the first directional coupler 32 and the leaked component of the first RF signal part to result in a first signal. The second voltage-controlled gain amplifier VGAR amplifies the second RF signal part received from the 2-way power splitter 36 (i.e., a reference signal Ref). The phase shifter VPhase adjusts a phase of the second RF signal part amplified by the second voltage-controlled gain amplifier VGAR to result in a second signal.

When the resistance of the tunneling resistor $R_t$ is relatively large, for example, 10 G ohms or much larger, the RF signal generator 33 is operated to generate the RF signal. Since the π-type LCR resonant circuit has been set to achieve impedance matching in this condition, the magnitude of the reflected RF signal resulting from reflection of the first RF signal part by the π-type LCR resonant circuit is very low. Therefore, the reflected RF signal inputted to the first voltage-controlled gain amplifier VGA via the first directional coupler 32 may be considered fixed, and which in combination with the leaked component of the first RF signal part forms the background signal and may be regarded as being inputted to the first voltage-controlled gain amplifier VGA and being amplified thereby. That is to say, in this condition, the first signal only contains the aforementioned background signal amplified by the first voltage-controlled gain amplifier VGA. Since gain of the second voltage-controlled gain amplifier VGAR and phase of the phase shifter VPhase may be adjusted, the aforementioned background signal amplified by the first voltage-controlled gain amplifier VGA, and the second signal have substantially the same amplitude and are substantially 180 degrees out of phase. The RF signal compensating circuit 41 further includes a combiner 44 which is coupled electrically to the first voltage-controlled gain amplifier VGA and the phase shifter VPhase. The combiner 44 outputs a compensated reflected RF signal by adding the second signal to the first signal so as to cancel out the aforementioned background signal that is amplified by the first voltage-controlled gain amplifier VGA and that is contained in the first signal. In this condition, the compensated reflected RF signal is zero or approximate to zero.

In this way, the leaked component of the first RF signal part leaked from the main path 322 to the coupling path 321 of the first directional coupler 32 may be cancelled out, so that the compensated reflected RF signal outputted from the combiner 44 of the RF signal compensating circuit 41 is able to totally represent the variation of the reflected RF signal resulting from variation of the resistance of the tunneling resistor $R_t$.

The RF signal measuring device 4 further includes an RF power amplifier 45 coupled electrically to the combiner 44 of the RF signal compensating circuit 41, an RF power detector 46 coupled electrically to the RF power amplifier 45, and a computer 70 coupled electrically to the RF power detector 46. The RF power amplifier 45 amplifies the compensated reflected RF signal outputted by the combiner 44. The RF power detector 46 detects magnitude of power of the compensated reflected RF signal that is amplified by the RF power amplifier 45. The computer 70 generates the scanning result associated with the surface of the object 20 based on the magnitude of power of the compensated reflected RF signal detected by the RF power detector 46.

As shown in FIG. 13, the first embodiment of the RF reflectometry scanning tunneling microscope 3 according to the present invention further comprises a bias tee circuit 37 which is coupled electrically to the RF resonant circuit 31 and the main path 321 of the first directional coupler 32, a current-to-voltage converter 39 which is coupled electrically to the bias tee circuit 37, and a scanning controller 38 which is coupled electrically to the current-to-voltage converter 39. The bias tee circuit 37 includes a DC-blocking capacitor $C_s$ which is coupled electrically between the RF resonant circuit 31 and the main path 321 of the first directional coupler 32, and a high frequency choke (RFC) which is coupled electrically between the RF resonant circuit 31 and the current-to-voltage converter 39. In the present invention, an initial procedure is performed before the object 20 is scanned. In the initial procedure, the probe 10 is to be positioned relative to the object 20 by a sufficient distance, the frequency and amplitude of the RF signal generated by the RF signal generator 33 are set, and the gain of the first voltage-controlled gain amplifier VGA of the RF signal compensating circuit 41 is adjusted, such that the power of the first signal outputted by the first voltage-controlled gain amplifier VGA reaches a custom normalized operating power range (for example, −10 dBm to −30 dBm). The gain of the second voltage-controlled gain amplifier VGAR and the phase of the phase shifter VPhase may be subsequently adjusted, such that the leaked component of the first RF signal part and the reflected RF signal from the RF resonant circuit 31 that are amplified and that are contained in the first signal, and the second signal have substantially the same amplitude and are substantially 180 degrees out of phase. The combiner 44 adds the second signal to the first signal and outputs the compensated reflected RF signal via a 2-way power splitter 49 to a spectrum analyzer 40 which indicates the magnitude of the compensated reflected RF signal. Through observing the degree of weakening of the magnitude of the compensated reflected RF signal, the degree of cancellation of the component of the first RF signal part (i.e., the background signal) may be determined. For example, in a condition that the normalized power of the first signal outputted by the first voltage-controlled gain amplifier VGA is −10 dBm, if the power of the compensated reflected RF signal outputted by the RF signal compensating circuit 41 is −70 dBm, the degree of cancellation of the leaked component of the first RF signal part is 60 dB. Therefore, after the initial procedure has been completed, the power of the compensated reflected RF signal outputted by the RF signal compensating circuit 41 should be approximate to zero. If the initial procedure is required to be fine-tuned, a coarse tuning step is performed by moving the probe 10 toward the surface of the object 20. The probe 10 is configured to allow a tunneling current $I_t$ to flow between the probe 10 and the object 20 when a bias voltage is applied between the probe 10 and the object 20. The RF resonant circuit 31 is configured to output the tunneling current $I_t$ via the bias tee circuit 37 to the current-to-voltage converter 39 which amplifies the tunneling current $I_t$, converts the tunneling current $I_t$ thus amplified into an output voltage, and outputs the output voltage to the scanning controller 38. The scanning controller 38 controls the probe 10 based on the output voltage so that the altitude of the probe 10 with respect to the surface of the object 20 may be adjusted. After determining according to the output voltage that the tunneling current $I_t$ has reached a predetermined value, the scanning controller 38 controls the probe 10 so as to increase the altitude of the probe 10 with respect to the surface of the object 20, and the aforementioned initial procedure is performed once again. In this way, variation of capacitance as a result of the probe 10 approaching the surface of the probe 20 may be cancelled out.

Figure 14:
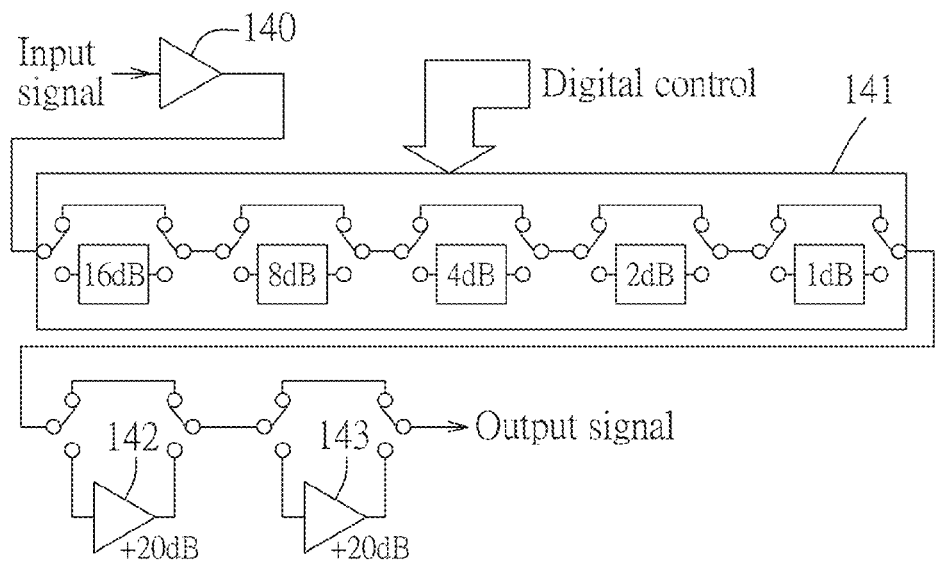
FIG. 14 is a circuit diagram illustrating a first voltage-controlled gain amplifier of the first embodiment.
Figure 15:
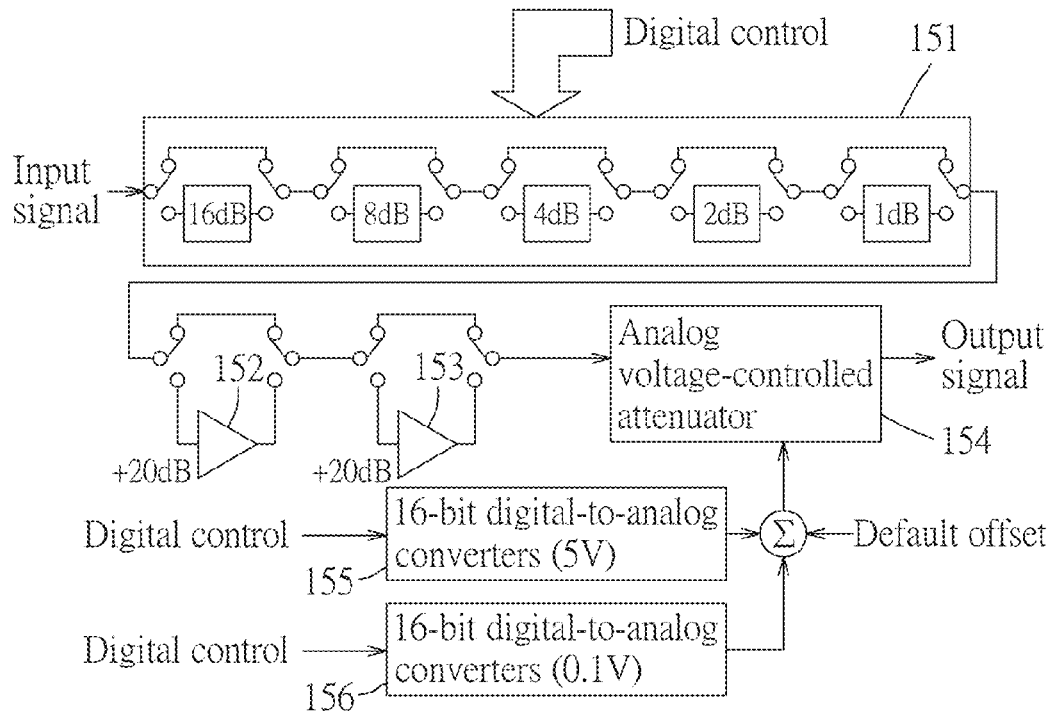
FIG. 15 is a circuit diagram illustrating a second voltage-controlled gain amplifier of the first embodiment.

In the first embodiment, the first voltage-controlled gain amplifier VGA, the second voltage-controlled gain amplifier VGAR, and the phase shifter VPhase are controlled by the computer 70, but may be alternatively controlled through manual operation. Referring to FIG. 14, a circuit diagram of the first voltage-controlled gain amplifier VGA is illustrated. An input signal (i.e., the reflected RF signal accompanied by the leaked component of the first RF signal part) is first amplified by 20 dB though a 20-dB amplifier 140. The input signal thus amplified is outputted to a digital step attenuator 141 with 1 dB minimum resolution, and is attenuated thereby so as to result in an attenuated signal. The attenuated signal is subsequently outputted to two series connected selective 20-dB amplifiers 142 and 143, and the magnitude of the attenuated signal is amplified thereby to reach a predetermined value (the range of amplification is from −10 dB to +60 dB), so as to result in the first signal. Referring to FIG. 15, a circuit diagram of the second voltage-controlled gain amplifier VGAR is illustrated. The gain of the second voltage-controlled gain amplifier VGAR is not necessarily large since the magnitude of the second RF signal part received from the 2-way power splitter 36 (i.e., the reference signal Ref) is originally larger than that of the leaked component of the first RF signal part which is leaked from the main path 322 to the coupling path 321 of the first directional coupler 32 (i.e., the background signal). However, since the magnitude of the second RF signal part received from the 2-way power splitter 36 is required as much as possible to be equal to that of the background signal of the first RF signal part during a compensation operation of the RF signal compensating circuit 41, relatively good resolution of the second voltage-controlled gain amplifier VGAR is desired. When the resolution of the second voltage-controlled gain amplifier VGAR reaches 0.0001 dB, the 40 dB degree of cancellation of the background signal may be obtained. When the resolution of the second voltage-controlled gain amplifier VGAR reaches 0.000001 dB, the 60 dB degree of cancellation of the leaked component may be obtained. Therefore, aside from a digital step attenuator 151 followed by two series connected selective 20-dB amplifiers 152 and 153 similar to those of the first voltage-controlled gain amplifier VGA, the second voltage-controlled gain amplifier VGAR further includes an analog voltage-controlled attenuator 154, and two 16-bit digital-to-analog converters 155 and 156 which respectively have voltage conversion ranges of 5 V and 0.1 V, and which generate output voltage signals for controlling the voltage-controlled attenuator 154, so as to achieve the required resolution.

Figure 16:
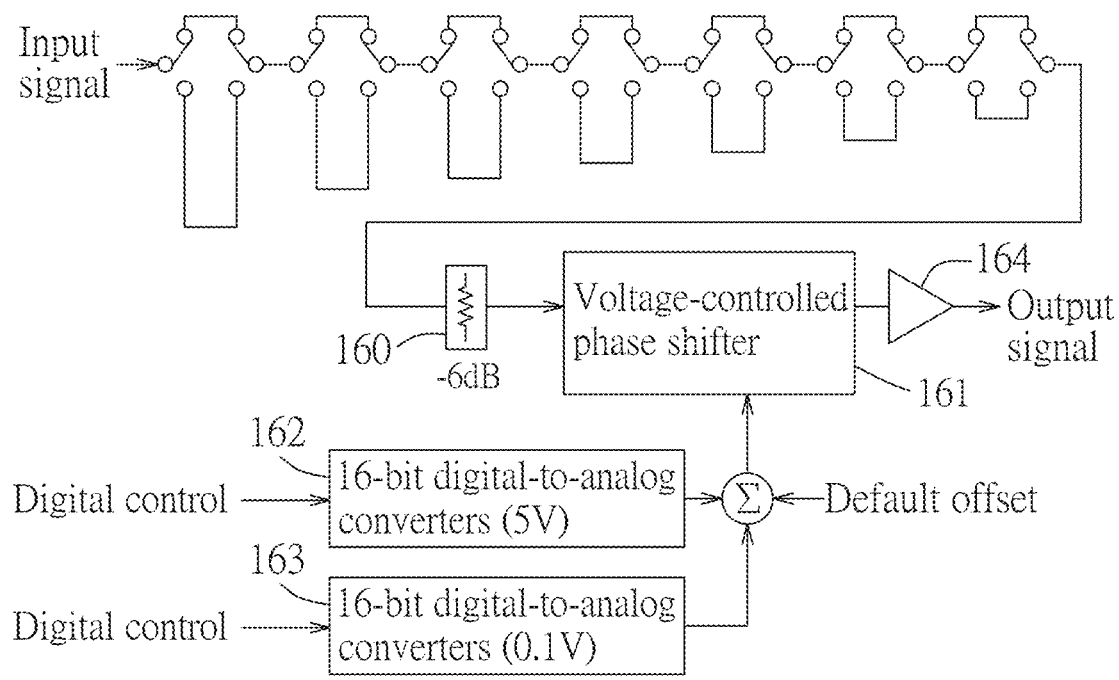
FIG. 16 is a circuit diagram illustrating a phase shifter of the first embodiment.

In addition, for the purpose of precise 180-degree phase shift performed by the phase shifter VPhase, an operation range thereof should exceed 180 degrees, and precision thereof should be better than degree scale. The reason is that if both the magnitude of the background signal of the first RF signal part, and that of the second RF signal part are −10 dBm, a one degree phase difference between the background signal of the first RF signal part, and the second RF signal part will result in a −45 dBm residual signal after the compensation operation of the RF signal compensating circuit 41, while a 0.1 degree phase difference will result in only a −65 dBm residual signal. Referring to FIG. 16, in practice, the phase shifter VPhase of the first embodiment performs large angle phase shift by selecting among signal transmission paths with different lengths for adjusting a length of a transmission path of a signal (i.e., the second RF signal part amplified by the second voltage-controlled gain amplifier VGAR). The phase shifter VPhase further includes an attenuator 160 which attenuates the signal (for example, −6 dB), and a voltage-controlled phase shifter 161 which is one of a CLC-type and LC-type phase shifter composed of a voltage-controlled capacitor and an inductor, and which fine tunes a phase of the signal attenuated by the attenuator 160 to result in a shifted signal. The phase shifter VPhase further includes two 16-bit digital-to-analog converters 162 and 163 which respectively have voltage conversion ranges of 5 V and 0.1 V, and which generate output voltage signals for controlling the voltage-controlled phase shifter 161. In this way, the phase shifter VPhase may achieve at least 0.001 degree resolution. The phase shifter VPhase further includes an impedance-matched amplifier 164 which amplifies the shifted signal outputted by the voltage-controlled phase shifter 161 to result in the second signal.

Since the compensation operation of the RF signal compensating circuit 41 is only effective for signals with a specific frequency, high order harmonic components in the to-be-compensated signal RFr are not cancelled out. Moreover, since the RF power detector 46 is implemented by a power detector which is capable of operating in a wideband, the high order harmonic components in the to-be-compensated signal RFr may be still contained in an output signal of the RF power detector 46, and a signal-to-noise ratio of the compensated reflected RF signal is reduced. Therefore, as shown in FIG. 13, the RF signal measuring device 4 further includes a band-pass filter 48 which is coupled electrically to an output terminal of the combiner 44 of the RF signal compensating circuit 41, and which filters the compensated reflected RF signal outputted by the combiner 44. Further, if the signal-to-noise ratio is of great concern, the band-pass filter 48 may be implemented using one of a crystal filter and a surface acoustic wave filter which have relatively high Q factors. A narrower bandwidth of the band-pass filter 48 contributes to the increase of the signal-to-noise ratio of the compensated reflected RF signal. However, these kinds of filters available on the market are mostly designed for commercial frequency bands, and are not necessarily suitable for the required frequency and bandwidth of the present invention.

Therefore, referring to FIG. 13, the RF signal measuring device 4 further includes a mixer 47, and a local oscillator LO that generates a local oscillator signal. The local oscillator signal has a frequency that corresponds to a sum of or a difference between the frequency of the compensated reflected RF signal and an operating frequency of the band-pass filter 48. Taking the compensated reflected RF signal having the frequency of 820 MHz for example, when a commercial band-pass filter 48 having the operating frequency of 374 MHz is used, the frequency of the local oscillator signal may be set to 820−374=446 MHz, or 820+374=1194 MHz. Subsequently, the mixer 47 mixes the frequencies of the local oscillator signal and the compensated reflected RF signal outputted by the RF signal compensating circuit 41, so as to shift the frequency of the compensated reflected RF signal to an operating frequency band of the commercial band-pass filter 48. The band-pass filter 48 filters the compensated reflected RF signal having the frequency shifted by the mixer 47 to result in a filtered signal. The RF power amplifier 45 amplifies a filtered signal outputted from the band-pass filter 48, and transmits the filtered signal thus amplified to the RF power detector 46. In this way, the signal-to-noise ratio of the compensated reflected RF signal may be significantly promoted.

Figure 17:
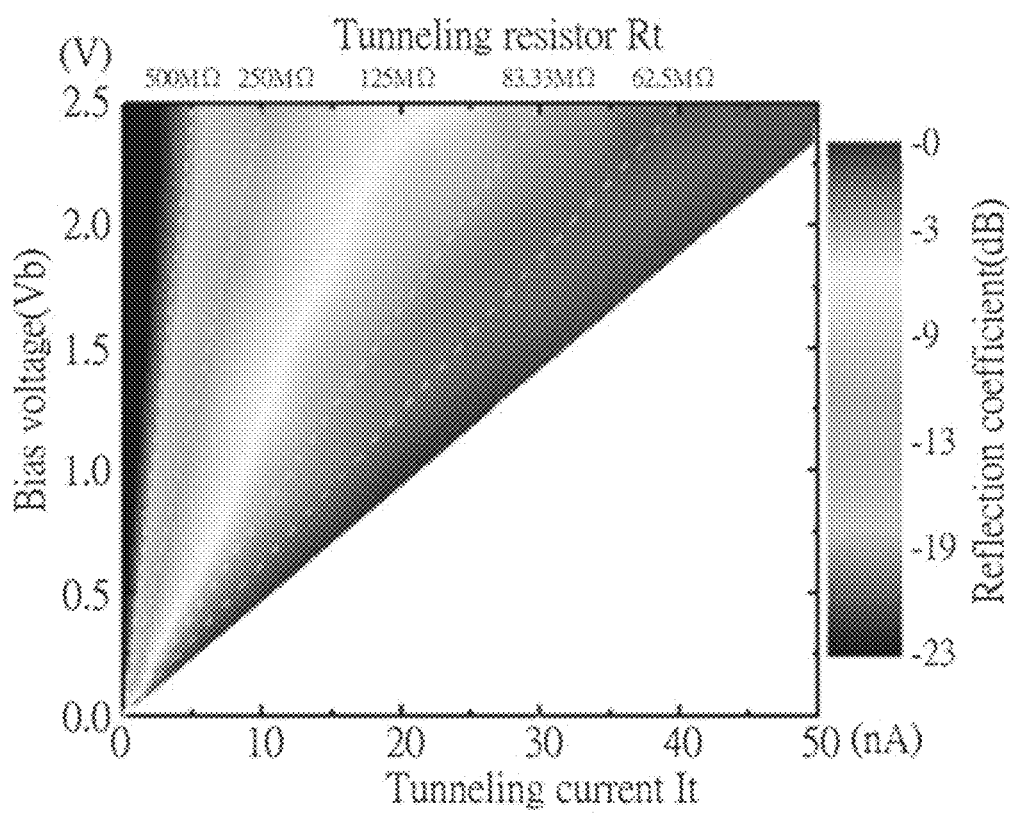
FIG. 17 illustrates a relationship among the reflection coefficient, resistance of the tunneling resistor, the tunneling current, and a bias voltage.

In the first embodiment of the RF reflectometry scanning tunneling microscope 3, the magnitude of the compensated reflected RF signal is only associated with the tunneling resistor $R_t$. Referring to FIG. 17, a relationship among the reflection coefficient Γ, resistance of the tunneling resistor $R_t$, the tunneling current $I_t$, and the bias voltage $V_b$, which is derived from experimental results, is illustrated. It is evident from this relationship that under the different tunneling current $I_t$ and bias voltage $V_b$, if the resistance of the tunneling resistor $R_t$ is fixed, the reflection coefficient Γ (represented by shades) is also kept constant. Since the tunneling resistor $R_t$ is determined according to electron configurations on the surface of the object 20 and the probe 10, the variation of the reflection coefficient Γ measured in the first embodiment actually results from the near-field effect (i.e., within a nanometer distance).

Figure 18:
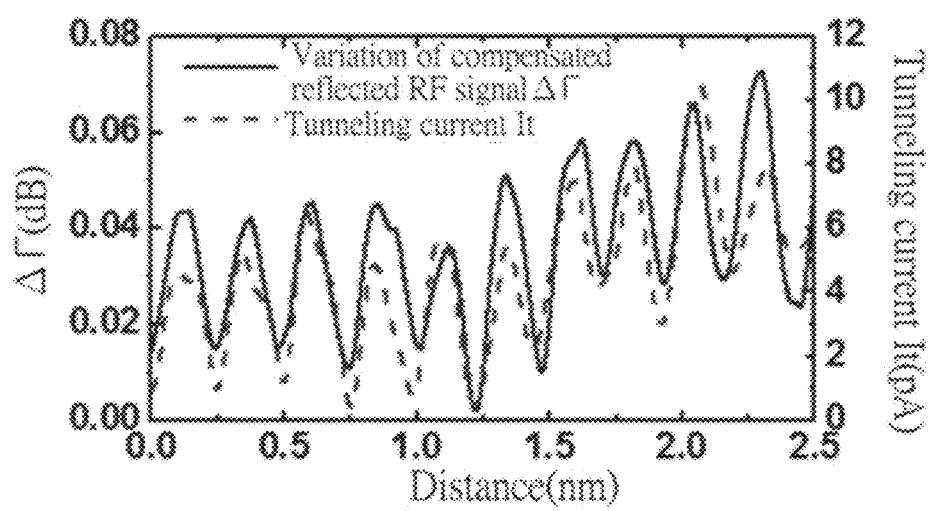
FIG. 18 illustrates a relationship between a variation of the compensated reflected RF signal and the tunneling current.

In order to prove that the variation of the reflection coefficient Γ corresponds to the tunneling current $I_t$, in the first embodiment, a surface of graphite is given as an example for the surface of the object. Referring to FIG. 18, a relationship that is between a variation of the compensated reflected RF signal ΔΓ and the tunneling current $I_t$ and that is obtained by scanning along a line is illustrated. Each rising and falling along the relationship between the variation of the compensated reflected RF signal ΔΓ and the tunneling current $I_t$ represents a signal of a respective carbon atom. It is evident from FIG. 18 that the variations of the compensated reflected RF signal ΔΓ and the tunneling current $I_t$ are highly consistent with each other. When the probe 10 is slightly moved away from the surface of the object 20, the tunneling current $I_t$ disappears, and the compensated reflected RF signal no longer changes. Therefore, it is the near field effect that leads to the variation of the compensated reflected RF signal ΔΓ.

Figure 19:
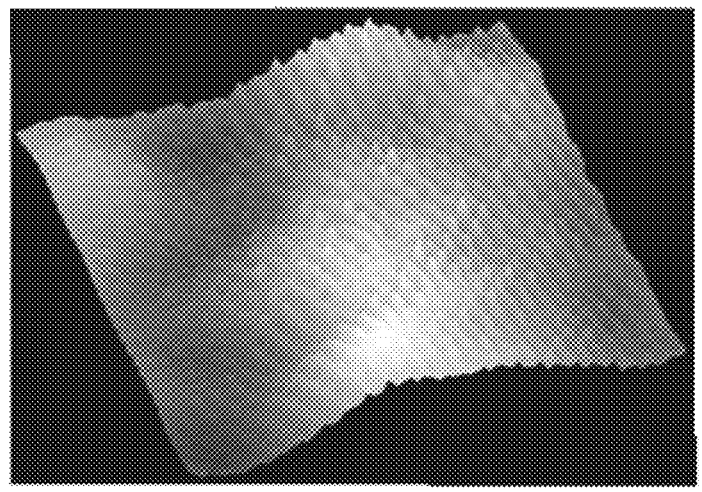
FIG. 19 is an RF scanning image illustrating a scanning result associated with a surface of an object.
Figure 20:
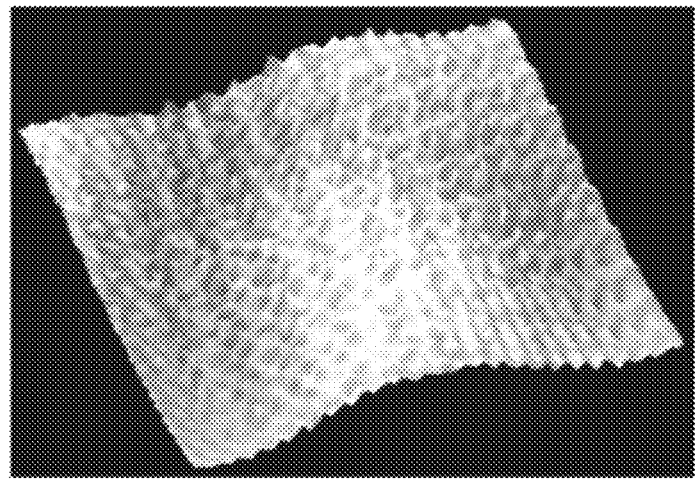
FIG. 20 is a current scanning image illustrating the scanning result associated with the surface of the object.
Figure 21:
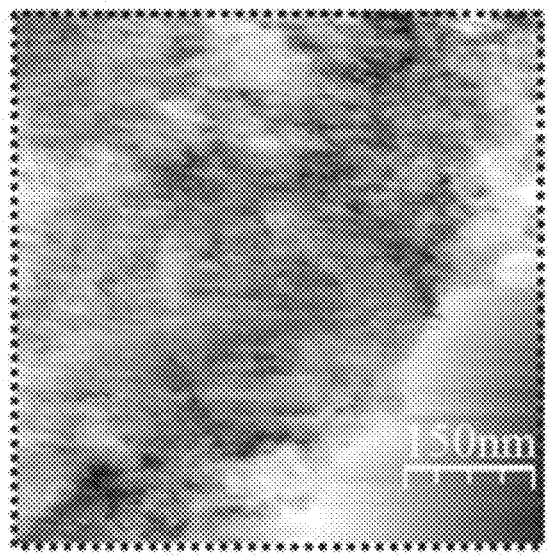
FIG. 21 is an image of an area on the surface of the object obtained through the first embodiment which operates under a constant current mode.
Figure 22:
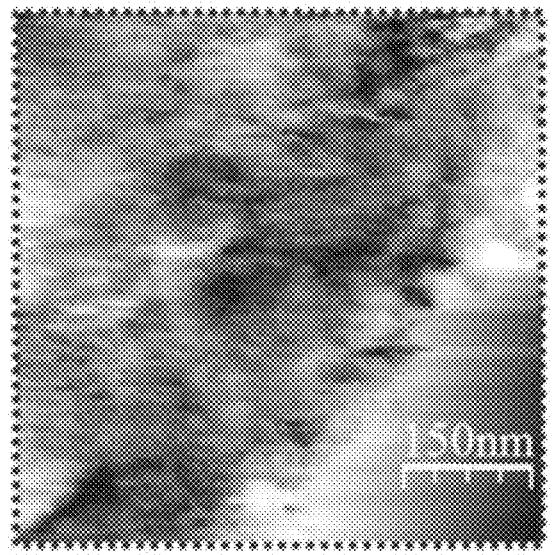
FIG. 22 is an image of the same area on the surface of the object obtained through the first embodiment which operates under a constant RF reflection magnitude mode.

When a scanning range of the first embodiment expands from a line to a plane, the scanning result associated with the surface of the object 20 may be illustrated in 3D in a RF scanning image as shown in FIG. 19 and a current scanning image as shown in FIG. 20. It is evident from the RF and current scanning images that they have a high correlation therebetween. Each single atom may be clearly recognized, and a signal-to-noise ratio of the RF scanning image shown in FIG. 19 is even better than that of the current scanning image shown in FIG. 20. Therefore, since the variations of the compensated reflected RF signal ΔΓ and the tunneling current $I_t$ are highly consistent with each other, the former may be used as a substitute for the latter to serve as a feedback control mechanism such that the probe 10 may be controlled to oscillate up and down along with the surface of the object 20. Similar to the constant current mode, when the magnitude of the compensated reflected RF signal is constant, i.e., the tunneling resistor $R_t$ is constant, the altitude of the probe 10 with respect to the surface of the object 20 may be also kept fixed (i.e., a constant RF reflection magnitude mode). For example, the first embodiment is configured to operate in the constant current mode and the constant RF reflection magnitude mode, respectively for scanning the same area on the surface of the object 20, and two images obtained under the respective constant current mode and the constant RF reflection magnitude mode are illustrated in FIG. 21 and FIG. 22, respectively. It is evident from FIG. 21 and FIG. 22 that through these two modes, very consistent surface images of the object 20 may be obtained. Alternatively, a phase of the reflected RF signal may be kept constant in the constant RF reflection magnitude mode.

Figure 23:
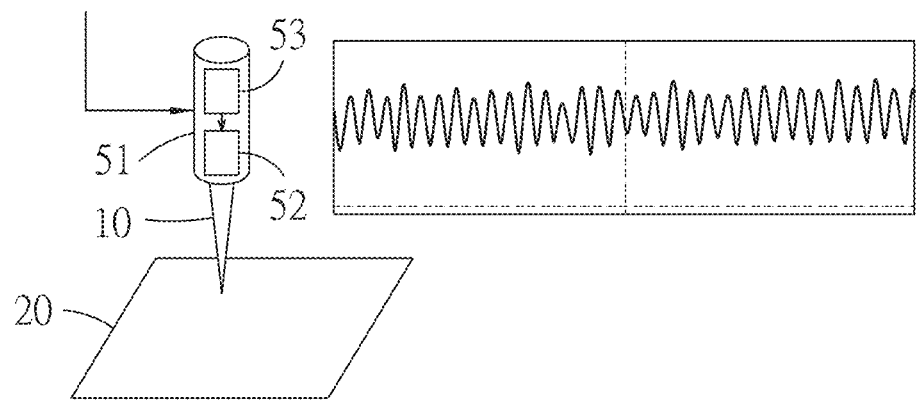
FIG. 23 is a schematic diagram illustrating that when the probe is sufficiently close to the object, magnitude of a compensated reflected RF signal varies in response to a driving signal inputted to the probe.
Figure 24:
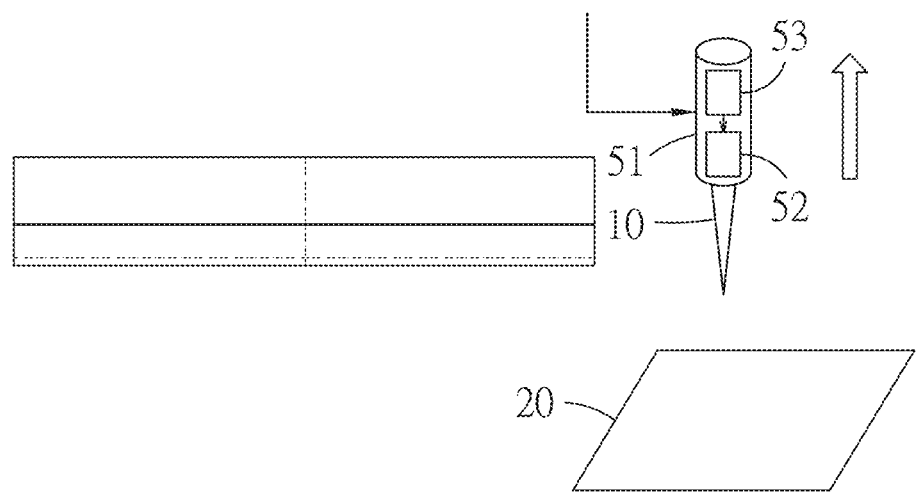
FIG. 24 is a schematic diagram illustrating that when the altitude of the probe with respect to the surface of the object is increased to an extent that the tunneling current disappears, the magnitude of the compensated reflected RF signal is kept fixed.

Referring to FIG. 23, in the first embodiment, the probe 10 includes a piezoelectric ceramic crystal (PZT) 52 which is disposed along a Z-axis 51 of the probe 10, and which is driven to control the altitude of the probe 10 with respect to the surface of the object 20 so as to actuate vibration of the probe 10. Referring to FIG. 24, when the altitude of the probe 10 with respect to the surface of the object 20 is increased to an extent that the tunneling current $I_t$ disappears, the magnitude of the compensated reflected RF signal is kept fixed.

Figure 25:
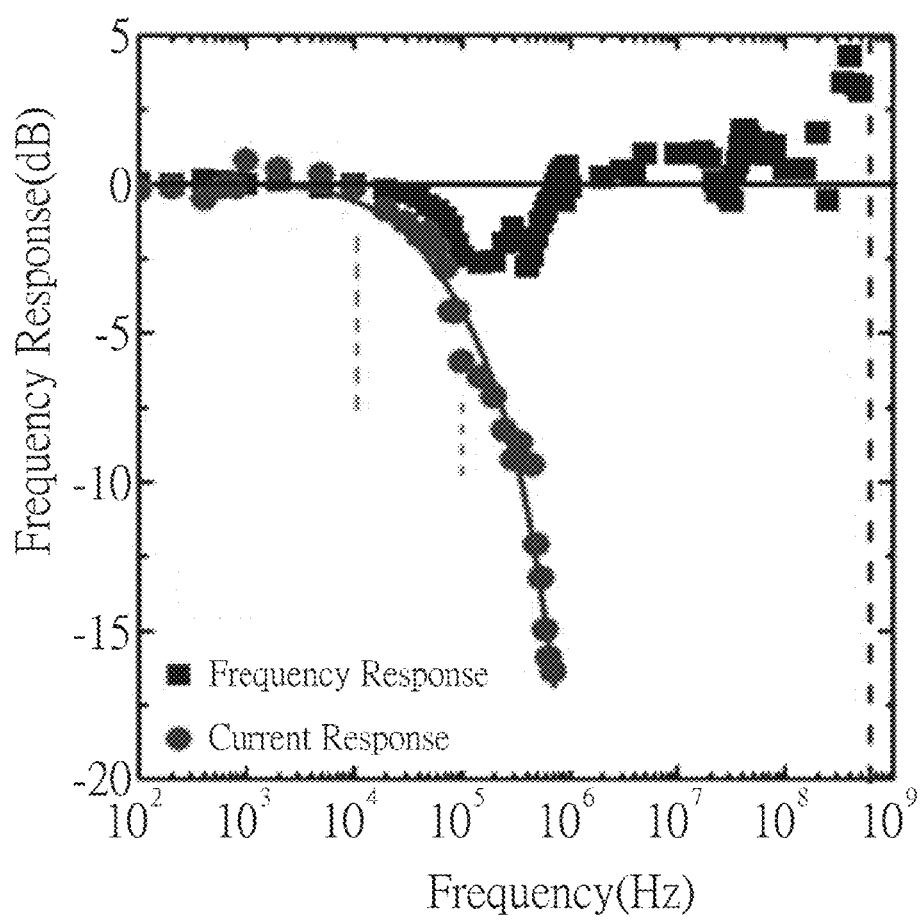
FIG. 25 is a frequency response of the first embodiment illustrating that a relatively wide detecting bandwidth is achieved.

In order to compare bandwidths between a DC scanning response (i.e., the tunneling current $I_t$ is used for feedback control) and an RF scanning response (i.e., the compensated reflected RF signal is used for feedback control), the amplitudes of power of each of the tunneling current $I_t$ and the compensated reflected RF signal are measured while gradually increasing the frequency of a driving signal for driving the PZT 52. It is evident from an experimental result illustrated in FIG. 25 that when the frequency of the driving signal is increased from 100 Hz to 500 MHz, the amplitude of the tunneling current $I_t$ begins to drop at 10 KHz, and a response at 100 KHz is −7 dB (about ⅙). On the other hand, the amplitude of the compensated reflected RF signal remains flat until the frequency of the driving signal reaches 500 MHz (an upper limit for an oscilloscope used for the measurement). This detecting bandwidth is far beyond an operating bandwidth of any existing scanning tunneling microscope.

Figure 26:
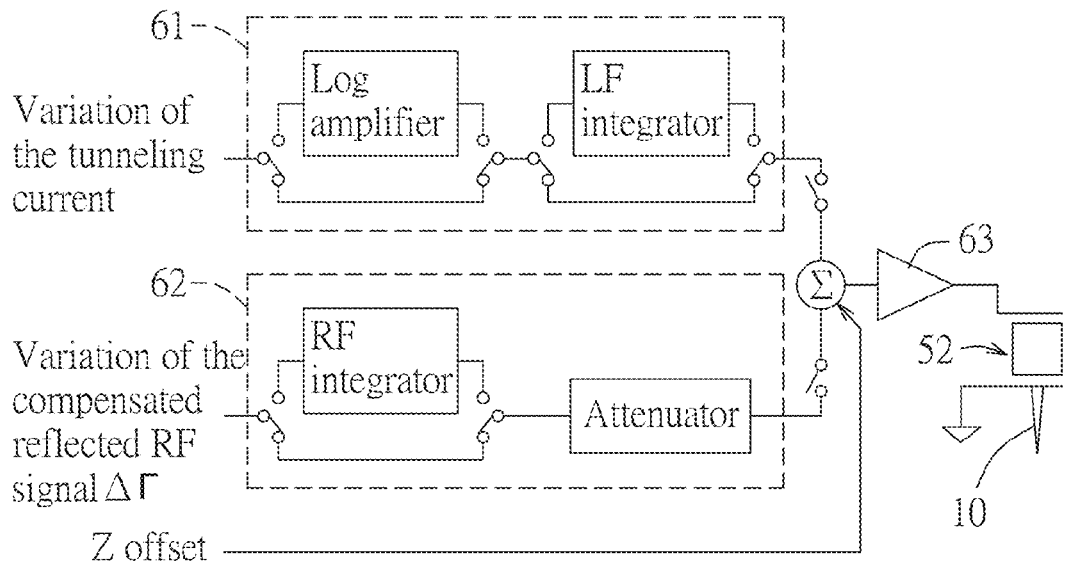
FIG. 26 is a circuit block diagram illustrating a scanning controller in one configuration of the first embodiment.

Furthermore, the scanning controller 38 of the first embodiment is able to generate the driving signal for controlling vibration of the probe 10 based on at least one of the variation of the tunneling current $I_t$ and the variation of the compensated reflected RF signal $\Delta\Gamma$. In practice, different combinations may be adopted for implementing the feedback control. For example, solely the variation of the tunneling current $I_t$ is adopted, solely the variation of the compensated reflected RF signal $\Delta\Gamma$ is adopted, or both are adopted. Since the bandwidth of the RF signal is higher, the variation of the compensated reflected RF signal $\Delta\Gamma$ is more favorable in feedback control. Referring to FIG. 26, in one configuration of the first embodiment, the scanning controller 38 includes a first signal processor 61, a second signal processor 62, an adder, and an amplifier 63. The first signal processor 61 processes the output voltage which is outputted by the current-to-voltage converter 39 and which may represent the variation of the tunneling current $I_t$. The second signal processor 62 processes the magnitude of power of the compensated reflected RF signal which is detected by the RF power detector 46 and which may represent the variation of the compensated reflected RF signal $\Delta\Gamma$. The adder outputs a result by adding the output voltage processed by the first signal processor and the magnitude of power of the compensated reflected RF signal processed by the second signal processor 62 in a certain proportion. The amplifier 63 amplifies the result outputted by the adder so as to generate the driving signal for driving the PZT 52 of the probe 10.

Figure 27:
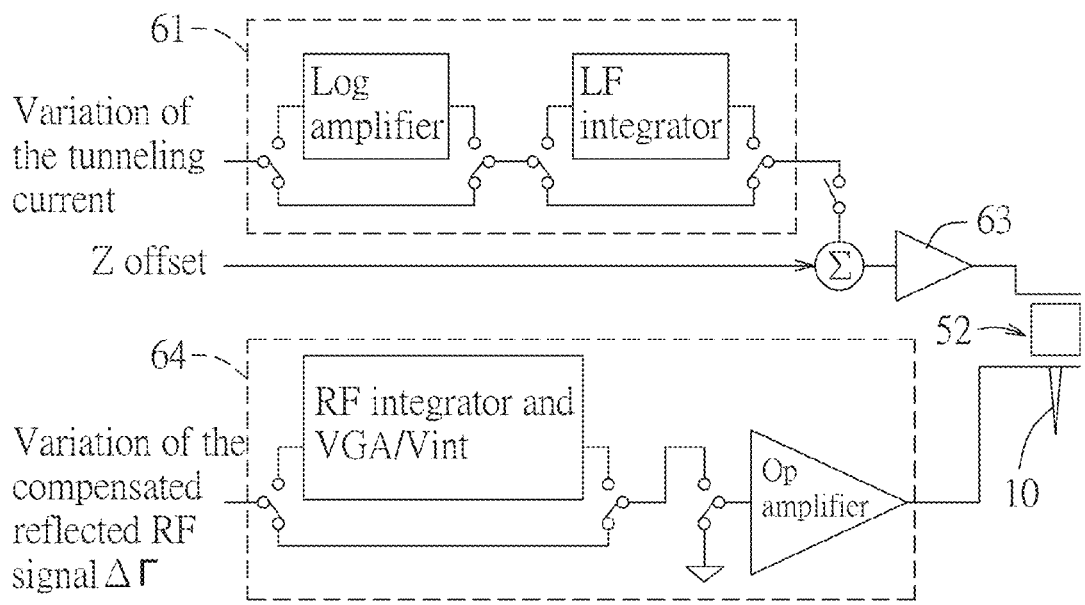
FIG. 27 is a circuit block diagram illustrating the scanning controller in another configuration of the first embodiment.

Referring to FIG. 27, in another configuration of the first embodiment, the scanning controller 38 includes a first signal processor 61, an amplifier 63, and a second signal processor 64. The first signal processor 61 processes the output voltage outputted by the current-to-voltage converter 39 to result in a processed output voltage. The amplifier 63 amplifies the processed output voltage from the first signal processor 61, and outputs the processed output voltage thus amplified to a first end of PZT 52. The second signal processor 64 processes the magnitude of power of the compensated reflected RF signal detected by the RF power detector 46, and outputs the magnitude of power of the compensated reflected RF signal thus processed to a second end of the PZT 52 for driving the PZT 52 of the probe 10. In this way, the compensated reflected RF signal may be free from the limitation of the amplifier 63.

Figure 28:
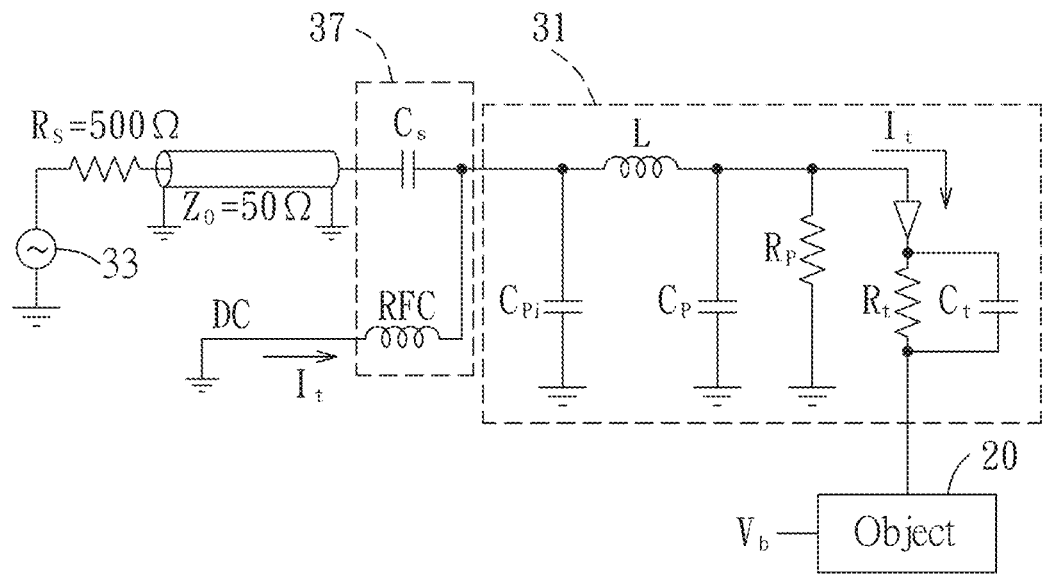
FIG. 28 is a circuit diagram illustrating that a bias voltage is applied to the object and the probe is grounded.

It is noted that, referring to FIG. 28, when the tunneling effect occurs between the probe 10 and the object 20, aside from the tunneling resistor $R_t$ formed between the probe 10 and the object 20, a tunneling barrier capacitor $C_t$ is also formed between the probe 10 and the object 20 in practice. For the formation of the tunneling resistor $R_t$, the probe 10 must be sufficiently close to the object 20. In the first embodiment, a bias voltage $V_b$ may be applied to the object 20. The probe 10 is grounded and is adapted to cooperate with the object 20 to form the tunneling resistor $R_t$ therebetween as a result of the tunneling effect. The tunneling current $I_t$ is outputted from the RF resonant circuit 31, via the high frequency choke RFC of the bias tee circuit 37, to the current-to-voltage converter 39. If the object 20 is a material with high electrical conductivity, the tunneling resistor $R_t$ is a major factor that affects the magnitude of the reflected RF signal. At this moment, the capacitance of the tunneling barrier capacitor $C_t$ is generally below attofarad scale ($10^{-18}$ farad), and barely affects the π-type LCR resonant circuit. The aforementioned embodiment is configured to perform scanning upon the object 20 under this condition.

On the contrary, when the object 20 is a dielectric material with high electrical resistivity, even if the probe 10 is very close to the surface of the object 20, the resistance of the tunneling resistor $R_t$ formed between the probe 10 and the object 20 is still very large, such that the tunneling resistor $R_t$ barely affects the magnitude of the reflected RF signal. At this moment, capacitance of the tunneling barrier capacitor $C_t$ varies according to variation of the altitude of the probe 10 with respect to the surface of the object 20. Therefore, referring to FIG. 13, the RF signal compensating circuit 41 of the first embodiment further includes a second directional coupler 42 that has a coupling path 421 and that is disposed between the phase shifter VPhase and an input terminal of the combiner 44 of the RF signal compensating circuit 41. The RF signal measuring device 4 further includes a third directional coupler 43 that has a coupling path 431 and that is disposed at an output terminal of the combiner 44, an amplifier 71 that is coupled electrically to the coupling path 431 of the third directional coupler 43, and a phase difference detector 72 that is coupled electrically to an output terminal of the amplifier 71 and the coupling path 421 of the second directional coupler 42. The second directional coupler 42 couples the second signal outputted by the phase shifter VPhase to the phase difference detector 72. The third directional coupler 43 couples the compensated reflected RF signal outputted by the combiner 44 to the amplifier 71. The amplifier 71 amplifies the compensated reflected RF signal received from the third directional coupler 43 to result in a third signal, and outputs the third signal to the phase difference detector 72. The phase difference detector 72 detects a phase difference between the second signal and the third signal. The phase difference detected by the phase difference detector 72 may reflect the reactive effect of tunneling energy barrier, i.e., the dielectric property of the object 20. The computer 70 may also obtain the scanning result of the surface of the object 20 based on variation of the phase difference detected by the phase difference detector 72. Therefore, the first embodiment may also measure the reactive effect on the surface of the object 20 by detecting the variation of the phase difference so as to achieve higher temporal and spatial resolutions.

Figure 29:
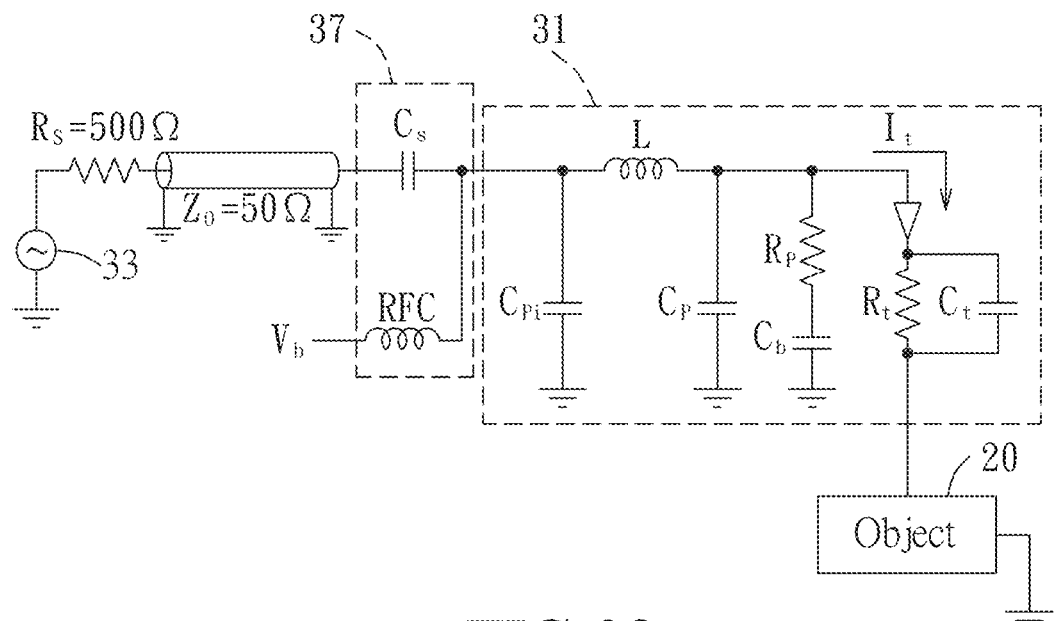
FIG. 29 is a circuit diagram illustrating that the object is grounded, and the LCR resonant circuit is applied with a bias voltage.

Moreover, referring to FIG. 29, another configuration for providing a bias voltage $V_b$ between the probe 10 and the object 20 is illustrated. The object 20 is grounded. The current-to-voltage converter 39 is configured to provide a bias voltage $V_b$ via the high frequency choke RFC of the bias tee circuit 37 to the RF resonant circuit 31, such that the π-type LCR resonant circuit is applied with the bias voltage $V_b$. In this configuration, since the magnitude of the tunneling current $I_t$ flowing though the tunneling resistor $R_t$ is desired to be measured, for preventing the tunneling current $I_t$ from flowing through the resistor $R_p$ instead of the tunneling resistor $R_t$ (because $R_p \ll R_t$), the RF resonant circuit 31 further includes a blocking capacitor $C_b$ connected in series with the resistor $R_p$ so as to block the DC current flowing through the resistor $R_p$. Further, when capacitance of the blocking capacitor $C_b$ is relatively large (greater than tens of nanofarad scale), the blocking capacitor $C_b$ is substantially equivalent to a short circuit for the RF signal having the operating frequency of hundreds of megahertz, but is substantially equivalent to an open circuit for a direct current. In this way, the tunneling current $I_t$ may entirely flow through the tunneling resistor $R_t$.

Figure 30:
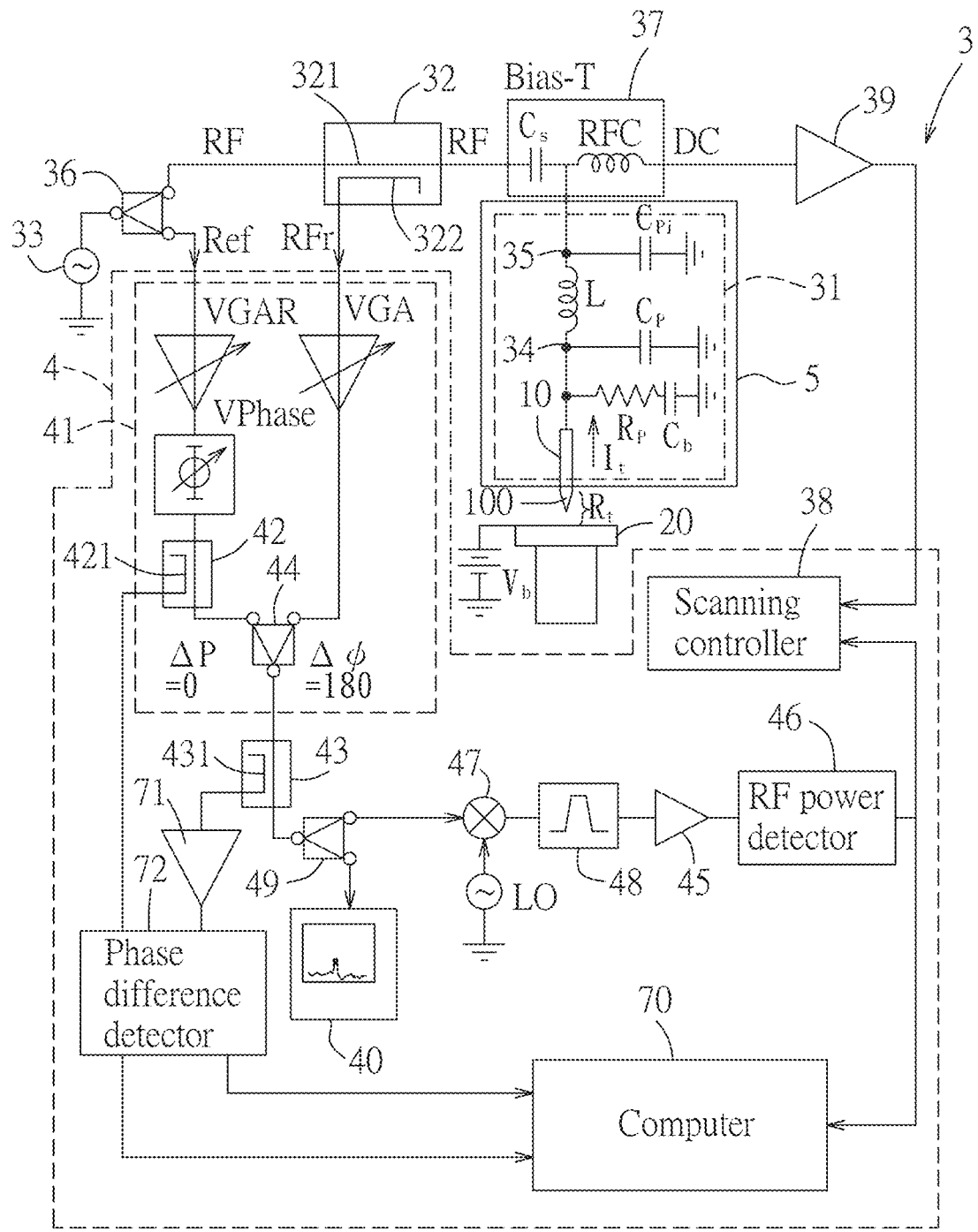
FIG. 30 is a circuit diagram illustrating a second embodiment of the RF reflectometry scanning tunneling microscope according to the present invention.
Figure 31:
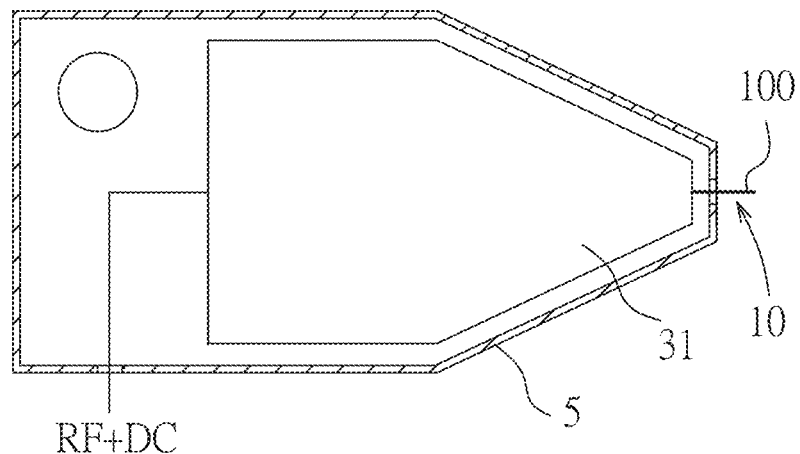
FIG. 31 is a schematic diagram illustrating a shielding casing of the second embodiment of the RF reflectometry scanning tunneling microscope according to the present invention.
Figure 32:
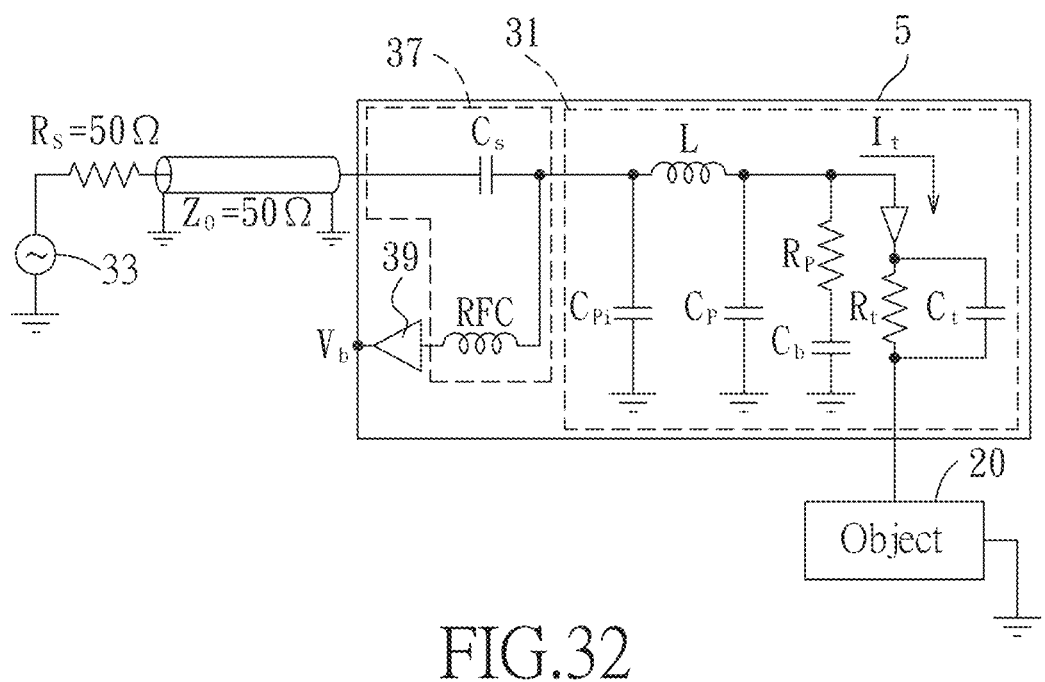
FIG. 32 is a circuit diagram illustrating that the probe, the RF resonant circuit, a bias tee circuit, and a current-to-voltage converter are accommodated in the shielding casing of the second embodiment.

Referring to FIG. 30, a second embodiment of the RF reflectometry scanning tunneling microscope 3 (referred to as RFSTM 3 hereinafter) according to the present invention differs from the first embodiment in that the RFSTM 3 further comprises a shielding casing 5. The shielding casing 5 is configured to house the probe 10 and the RF resonant circuit 31 therein, and is formed with an opening configured for extension of a tip 100 of the probe 10 therethrough and outwardly of the shielding casing 5 (see FIG. 31), so as to protect the RF resonant circuit 31 from interference of an external current that is generated by an external electron/current field with a relatively low frequency. The electron/current field may be incident electrons emitted by an electron gun, secondary electrons, Auger electrons, photoelectrons excited by radiation, a faradaic current generated as a result of electrochemical reaction, or combinations thereof. Preferably, referring to FIG. 32, the shielding casing 5 is further configured to house the bias tee circuit 37 and the current-to-voltage converter 39, such that the probe 10, the RF resonant circuit 31, the bias tee circuit 37, and the current-to-voltage converter 39 may be provided with good protection against interference.

Figure 33:
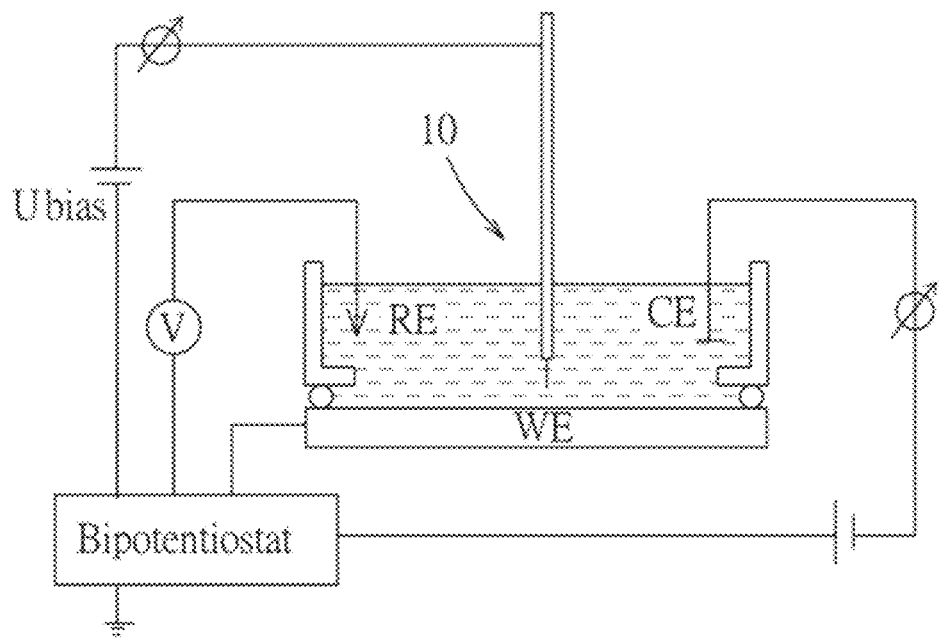
FIG. 33 is a schematic diagram illustrating that the probe of the second embodiment is used for observing a surface of an object that is immersed in a liquid-phase electrochemical reaction tank.

Aside from the constant RF reflection magnitude mode (referred to as constant RF mode hereinafter), the second embodiment of the RFSTM 3 also operates in the constant current mode in which a conventional tunneling microscope usually operates. When the probe 10 and the object 20 are exposed to an environment under the influence of the external electron/current field, for example, a faradaic current field generated in a liquid-phase electrochemical reaction tank as best shown in FIG. 33, the external current (not shown) generated by the external electron/current field may be combined with the tunneling current $I_t$ to serve as an aggregated current I. The aggregated current I is then amplified by the current-to-voltage converter 39, thereby adversely influencing the feedback control mechanism of the present invention, so that the scanning result of the surface of the object 20 may not be obtained properly.

Figure 34:
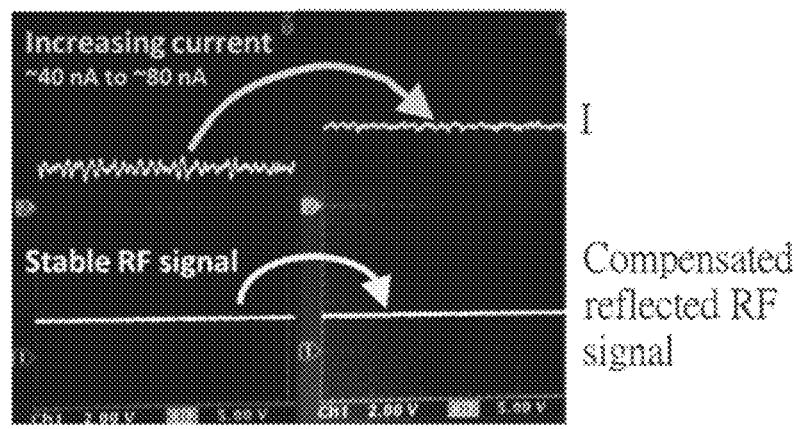
FIG. 34 illustrates that, in the second embodiment, the compensated reflected RF signal remains stable while an aggregated current is changing.

On the other hand, if the second embodiment of the RFSTM 3 operates in the constant RF mode, owing to the shielding effect provided by the shielding casing 5, the compensated reflected RF signal is not affected by the interference of the external electron/current field. Referring to FIG. 34, it is evident that even though the aggregated current I increases from 40 nano-amps to 80 nano-amps as a result of the presence of the external current, the amplitude of the compensated reflected RF signal remains steady. The altitude of the probe 10 with respect to the surface of the object 20 thus remains unchanged. In this way, by utilizing the compensated reflected RF signal for feedback control of the altitude of the probe 10 with respect to the surface of the object 20, the RFSTM 3 of the present invention may be effectively relieved from interference of the external current.

Specifically, for the second embodiment of the RFSTM 3 which operates respectively in the constant current mode and the constant RF mode for feedback control, a relationship between the external current and the altitude of the probe 10 with respect to the surface of the object 20 is further explained in the following paragraphs. For the sake of brevity, the altitude of the probe 10 with respect to the surface of the object 20 is referred to as an altitude Z of the probe 10 in the following paragraphs.

Figure 35A:
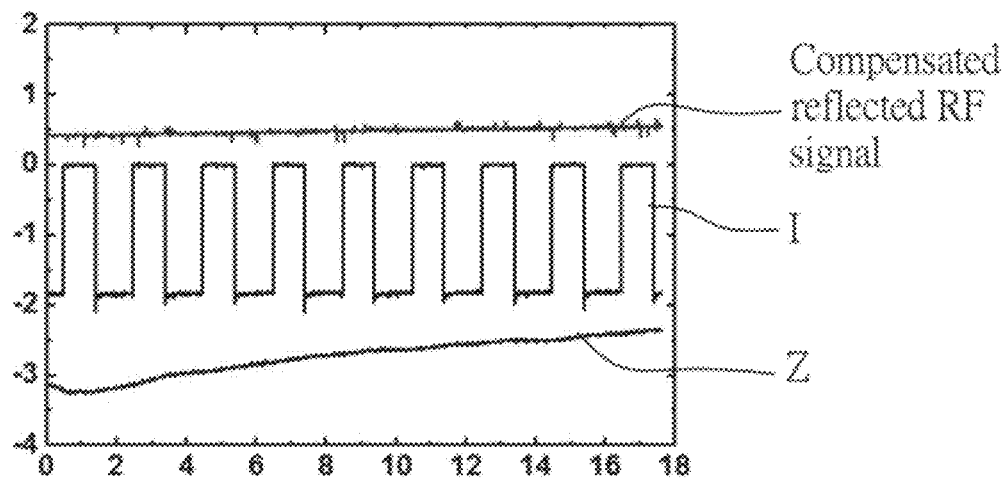
FIG. 35(a) illustrates that the altitude of the probe with respect to the surface of the object does not change according to variation of the aggregated current when the second embodiment operates under the constant RF reflection magnitude mode.
Figure 35B:
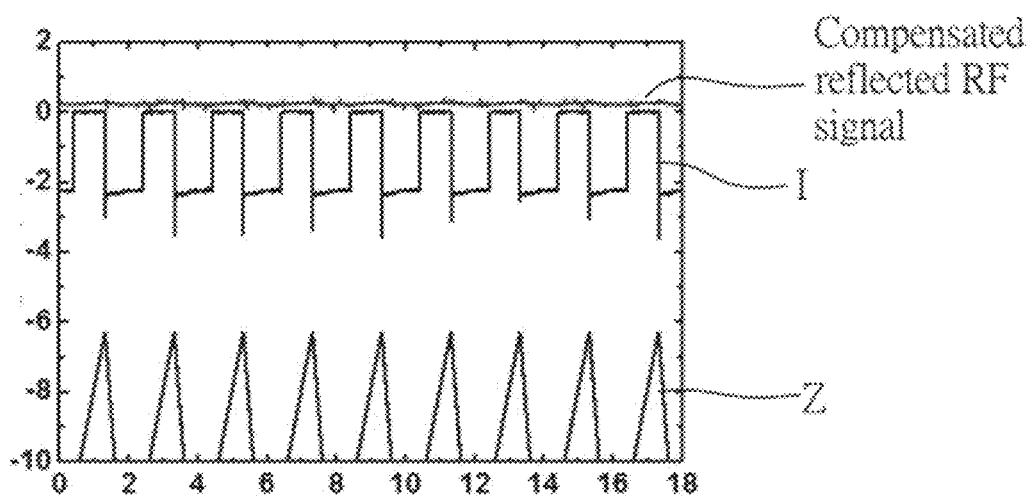
FIG. 35(b) illustrates that the altitude of the probe with respect to the surface of the object is significantly proportional to the integral of the aggregated current in the form of a square-wave when the second embodiment operates under the constant current mode.

Referring to FIG. 35(a) and FIG. 35(b), the external current generated by the external electron/current field is modulated into a square-wave, such that the waveform of the aggregated current I is changed as best shown in these figures. FIG. 35(a) clearly indicates that, under the constant RF mode for feedback control, the altitude Z of the probe 10 is subtly changed as a result of thermal shift, and is not significantly correlated to the aggregated current I. On the other hand, referring to FIG. 35(b), under the constant current mode for feedback control, the altitude Z of the probe 10 is significantly proportional to the integral of the aggregated current I in the form of a square-wave. Therefore, it is evident that the altitude Z of the probe 10 is more vulnerable to the external current under the constant current mode for feedback control compared with the altitude Z of the probe 10 is to the external current in the constant RF mode for feedback control.

Figure 36A:
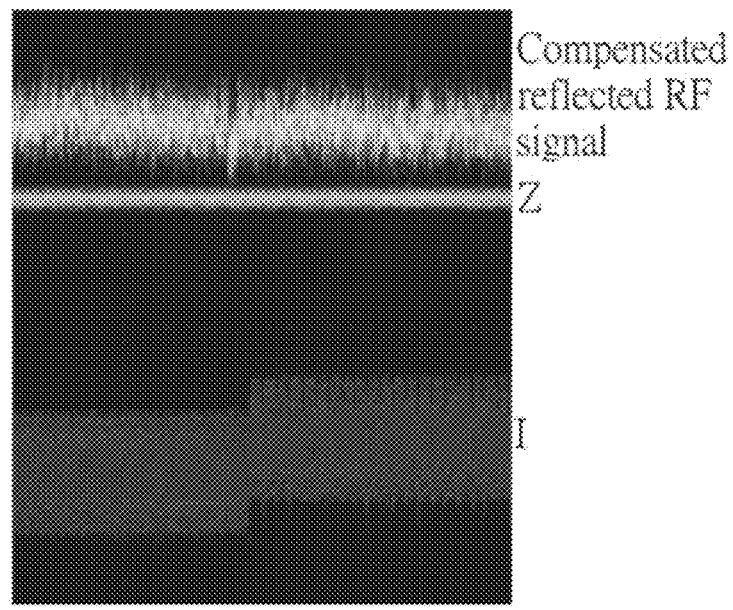
FIG. 36(a) illustrates variation of the aggregated current at the instant when an X-ray excitation source is activated in the second embodiment.
Figure 36B:
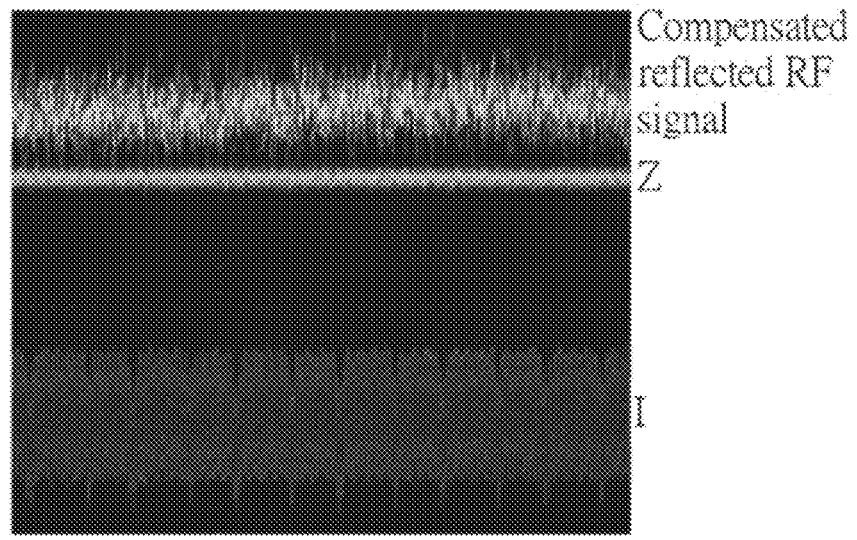
FIG. 36(b) illustrates the variation of the aggregated current when the X-ray excitation source is switched alternately between an ON state and an OFF state in the second embodiment.

Furthermore, the external current generated by the external electron/current field may be replaced by a photoelectric current which is excited by an X-ray excitation source for observation of a relationship between the aggregated current I and the altitude Z of the probe 10 under the constant RF mode for feedback control. At the instant when the X-ray excitation source is activated, the aggregated current I rises instantaneously to form a step-wise waveform, as best shown in FIG. 36(a), while the compensated reflected RF signal and the altitude Z of the probe 10 do not change according to the variation of the aggregated current I. On the other hand, when the X-ray excitation source is switched alternately between an ON state and an OFF state, as best shown in FIG. 36(b), the variation of the aggregated current I significantly corresponds to switching of the X-ray excitation source, but the compensated reflected RF signal and the altitude Z of the probe 10 do not change correspondingly. That is to say, for the RFSTM 3 which operates under the constant RF mode for feedback control, the compensated reflected RF signal and the altitude Z of the probe 10 may not change according to the external current.

In order to verify the efficiency of the second embodiment of the RFSTM 3, it is evident from FIG. 37(a) and FIG. 37(b) that an image of an area on the surface of the object 20 (a sheet of gold on mica) obtained under the constant current mode without interference of an external current is similar to an image of the area on the surface of the object 20 obtained under the constant RF mode with the presence of the external current.

Further, in the following test, the RFSTM 3 is operating under the constant RF mode, and the probe 10 and the object 20 are exposed to both a testing environment without an external current and a testing environment with the presence of a modulated (12 Hz) external current. It is evident that an image of an area on the surface of the object 20 obtained without interference of the external current (see FIG. 37(c)) is similar to that of the object 20 obtained with the presence of the external current (see FIG. 37(d)).

Moreover, the RFSTM 3 is configured to operate under the constant current mode for obtaining an image of the area on the surface of the object 20. Referring to FIG. 37(e), when one-third of the area on the surface of the object 20 has been scanned, an external current is provided. It may be noted that the image of the area on the surface of the object 20 is severely influenced after provision of the external current. In other words, as long as the second embodiment of the RFSTM 3 is operating under the constant RF mode, the scanning result associated with the surface of the object 20 may be obtained successfully regardless of interference of the external current.

As a result, in expectation of presence of an external current, the RFSTM 3 of the present invention is set to operate under the constant RF mode, and the magnitude of power of the compensated reflected RF signal detected under the constant RF mode may be directly utilized to move the probe 10 toward the surface of the object 20 to an extent that the tunneling effect occurs, such that a clear image of the area on the surface of the object 20 may be thus obtained even with the presence of the external current. However, in expectation of absence of an external current, the RFSTM 3 may be first set to operate under the constant current mode, and moves the probe 10 toward the surface of the object 20 to an extent that the tunneling effect occurs. Subsequently, the RFSTM 3 may be switched to operate under the constant RF mode, so that control of the altitude Z of the probe 10 may be alleviated from the influence of the external current, and a clear scanning result of the surface of the object 20 may be thus obtained.

Figure 38:
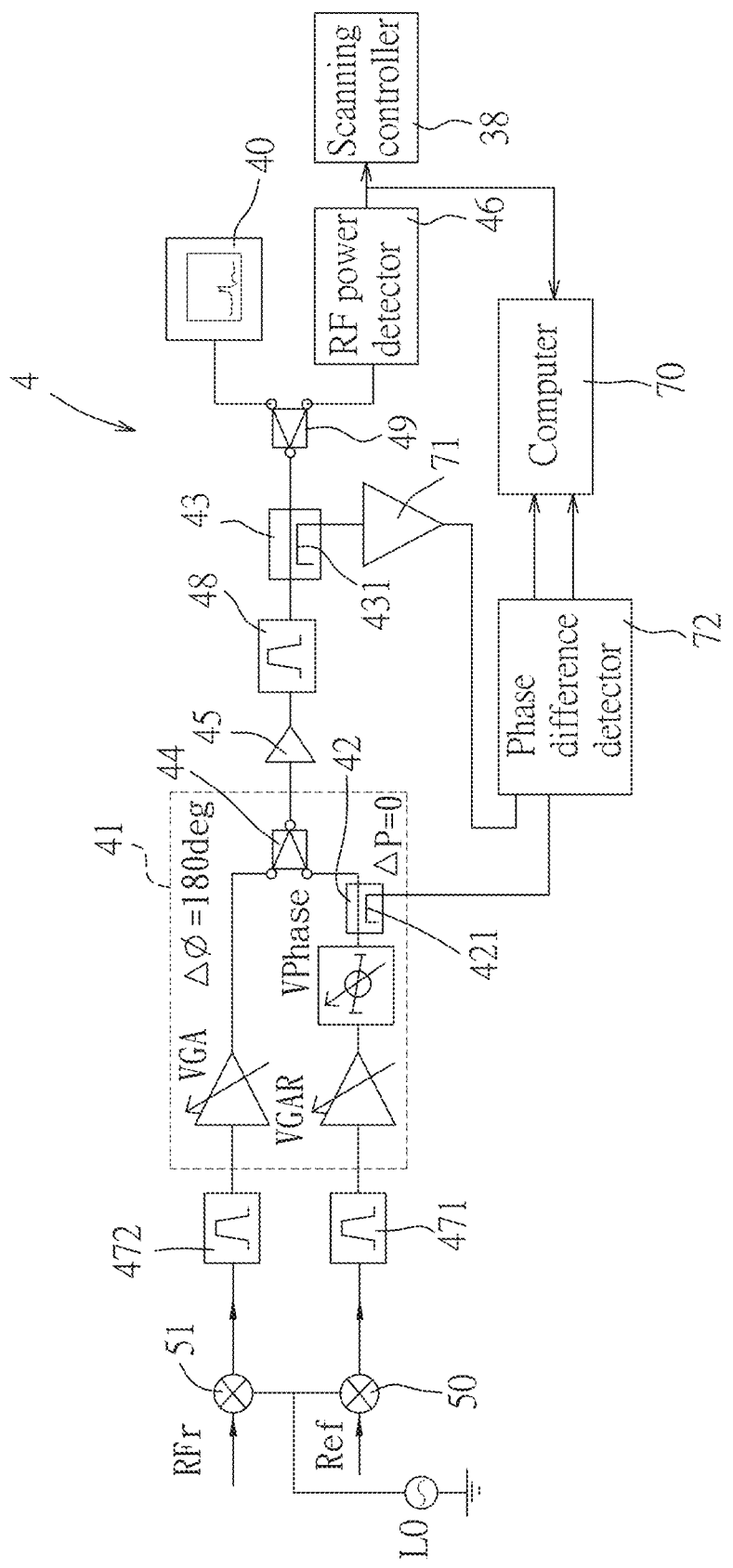
FIG. 38 is a circuit diagram illustrating a third embodiment of the RF reflectometry scanning tunneling microscope according to the present invention.

Referring to FIG. 38, a third embodiment of the RFSTM 3 according to the present invention differs from the second embodiment in that the mixer 47 is omitted and two mixers together with two band-pass filters are added, and the oscillator signal generated by the local oscillator LO is provided to the added mixers, respectively.

Specifically, the RF signal measuring device 4 of the third embodiment of the present invention, aside from the elements mentioned in the first embodiment, further includes a first input mixer 50 together with a first input band-pass filter 471 which are coupled between the 2-way power splitter 36 and the RF signal compensating circuit 41, and a second input mixer 51 together with a second input band-pass filter 472 which are coupled between the first directional coupler 32 and the RF signal compensating circuit 41.

The first input mixer 50 receives the reference signal Ref from the 2-way power splitter 36 and the oscillator signal from the local oscillator LO, and mixes frequencies of the reference signal Ref and the oscillator signal so as to generate a first mixed signal. The first mixed signal includes an operating frequency sub-signal and a non-operating frequency sub-signal. The second input mixer 51 receives the to-be-compensated signal RFr from the first directional coupler 32 and the oscillator signal from the local oscillator LO, and mixes frequencies of the to-be-compensated signal RFr and the oscillator signal so as to generate a second mixed signal. The second mixed signal includes an operating frequency sub-signal and a non-operating frequency sub-signal.

The first input band-pass filter 471 receives the first mixed signal from the first input mixer 50, filters out the non-operating frequency sub-signal of the first mixed signal, and outputs the first mixed signal, which has the non-operating frequency sub-signal filtered out, to the RF signal compensating circuit 41. The second input band-pass filter 472 receives the second mixed signal from the second input mixer 50, filters out the non-operating frequency sub-signal of the second mixed signal, and outputs the second mixed signal, which has the non-operating frequency sub-signal filtered out, to the RF signal compensating circuit 41.

The RF signal compensating circuit 41 receives the first mixed signal and the second mixed signal, and subjects the first mixed signal and the second mixed signal to the compensation operation mentioned in the first embodiment so as to output the compensated reflected RF signal. The RF power amplifier 45 is coupled electrically to the RF signal compensating circuit 41 for receiving the compensated reflected RF signal, and amplifies the compensated reflected RF signal to result in an amplified compensated signal. The band-pass filter 48 is coupled electrically to the RF power amplifier 45 for receiving the amplified compensated signal, and filters the amplified compensated signal to result in a filtered compensated signal. The 2-way power splitter 49 is coupled electrically to the band-pass filter 48 via the third directional coupler 43 for receiving the filtered compensated signal, and splits the filtered compensated signal into a first split signal and a second split signal. The RF power detector 46 is coupled electrically to the 2-way power splitter 49 for detecting a magnitude of power of the first split signal. The scanning controller 38 is coupled electrically to the RF power detector 46 for receiving the magnitude of power of the first split signal detected by the RF power detector 46, and controls the probe 10 based on the magnitude of power of the first split signal. The computer 70 is coupled electrically to the RF power detector 46, and generates the scanning result associated with the surface of the object 20 based on the magnitude of power of the first split signal detected by the RF power detector 46.

The third directional coupler 43 is coupled electrically between the band-pass filter 48 and the 2-way power splitter 49, and has the coupling path 431. The amplifier 71 is coupled electrically to the coupling path 431 of the third directional coupler 43. The third directional coupler 43 couples the filtered compensated signal outputted by the band-pass filter 48 to the amplifier 71. The amplifier 71 amplifies the filtered compensated signal received from the third directional coupler 43 to result in an amplified coupled signal, and outputs the amplified coupled signal to the phase difference detector 72. The phase difference detector 72 is coupled electrically to an output terminal of the amplifier 71 and the coupling path 421 of the second directional coupler 42. The phase difference detector 72 detects a phase difference between a phase-shifted signal that is associated with the first mixed signal and that is outputted by the second directional coupler 42, and the amplified coupled signal outputted by the amplifier 71. Specifically, the phase-shifted signal is similar to the second signal mentioned in the first embodiment which is obtained by subjecting the first mixed signal to the second voltage-controlled gain amplifier VGAR and the phase shifter VPhase.

The computer 70 is further coupled electrically to the phase difference detector 72, and may also obtain the scanning result of the surface of the object 20 based on variation of the phase difference detected by the phase difference detector 72.

In the third embodiment of the present invention, the first input mixer 50 together with the first input band-pass filter 471, and the second input mixer 51 together with the second input band-pass filter 472 are arranged respectively at input terminals of the RF signal compensating circuit 41 for the reason that the reference signal Ref and the to-be-compensated signal RFr may have frequencies down-converted and filtered, such that the operating frequency sub-signal of the first mixed signal and the operating frequency sub-signal of the second mixed signal thus obtained may have frequencies optimized. In this way, the RF signal compensating circuit 41 is alleviated from processing the non-operating frequency sub-signal of the first mixed signal and the non-operating frequency sub-signal of the second mixed signal, and performs the aforementioned compensation operation merely upon the operating frequency sub-signal of the first mixed signal and the operating frequency sub-signal of the second mixed signal so as to output the compensated reflected RF signal. The compensated reflected RF signal is then provided to the RF power amplifier 45 for subsequent processing mentioned above. Therefore, a signal-to-noise ratio of the scanning result obtained in the third embodiment may be further promoted.

To sum up, the RFSTM 3 of the present invention has the following advantages:

1. The present invention is capable of measuring the effect of the tunneling resistor $R_t$ formed between the probe 10 and the object 20 by means of the reflected RF signal. Furthermore, the phase difference between the second signal and the third signal may be detected so as to reflect the reactive effect on the surface of the object 20.

2. By means of the shielding effect provided by the shielding casing 5, the RFSTM 3 which operates under the constant RF mode may be alleviated from influence of the external current resulting from the external electron/current field, and the scanning result of the surface of the object 20 thus obtained is as clear as that obtained under the constant current mode without interference of the external electron/current field.

3. By respectively arranging the first input mixer 50 together with the first input band-pass filter 471, and the second input mixer 51 together with the second input band-pass filter 472 at input terminals of the RF signal compensating circuit 41, the signal-to-noise ratio of the scanning result thus obtained may be further promoted.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A radio-frequency (RF) reflectometry scanning tunneling microscope suitable for observing a surface of an object, said RF reflectometry scanning tunneling microscope comprising:
   a probe adapted to be positioned relative to the surface of the object, and to interact with the object to form a tunneling resistor therebetween;
   an RF resonant circuit including
      an inductor that has a first end connected to said probe,
      a capacitor connected to the first end of said inductor, and
      a resistor connected in parallel with said capacitor,
      wherein said RF resonant circuit is to cooperate with the tunneling resistor to form a LCR resonant circuit in which said inductor is connected to a parallel connection of said capacitor, said resistor and the tunneling resistor;
   a first directional coupler coupled electrically to a second end of said inductor of said RF resonant circuit, and configured to receive an RF signal, to output the RF signal thus received to the LCR resonant circuit, and to receive a reflected RF signal that results from reflection of the RF signal by the LCR resonant circuit; and
   an RF signal measuring device adapted to receive the reflected RF signal from the LCR resonant circuit via said first directional coupler, and operable to generate a scanning result associated with the surface of the object based on the reflected RF signal; and
   wherein said RF signal measuring device includes
      a local oscillator which generates a local oscillator signal,
      a first input mixer which receives a reference signal associated with the RF signal and the oscillator signal from said local oscillator, and which mixes frequencies of the reference signal and the oscillator signal so as to generate a first mixed signal, and
      a second input mixer which receives the reflected RF signal from said first directional coupler and the oscillator signal from said local oscillator, and which mixes frequencies of the reflected RF signal and the oscillator signal so as to generate a second mixed signal.

2. The RF reflectometry scanning tunneling microscope as claimed in claim 1, wherein said RF resonant circuit further includes an auxiliary capacitor that is connected to the second end of said inductor, said RF resonant circuit to cooperate with the tunneling resistor to form a Π-type LCR resonant circuit.

3. The RF reflectometry scanning tunneling microscope as claimed in claim 2, wherein said RF resonant circuit further includes:
   a first voltage-controlled capacitor which is connected in series with said capacitor of said RF resonant circuit, and which has a capacitance adjusted using a first bias voltage to thereby adjust a resonant frequency at which the Π-type LCR resonant circuit resonates; and
   a second voltage-controlled capacitor which is connected in series with said auxiliary capacitor of said RF resonant circuit, and which has a capacitance adjusted using a second bias voltage to thereby adjust an impedance of the Π-type LCR resonant circuit.

4. The RF reflectometry scanning tunneling microscope as claimed in claim 1, further comprising:
   an RF signal generator which is operable to generate the RF signal; and
   a 2-way power splitter which has two output ports, which is coupled electrically to said RF signal generator, which splits the RF signal generated by said RF signal generator into two RF signal parts, and which outputs the RF signal parts to said first directional coupler and said RF signal measuring device via said output ports, respectively;
   wherein the reflected RF signal received at said RF signal measuring device via said first directional coupler is accompanied by a leaked component of the RF signal part which is outputted from said 2-way power splitter and which passes through said first directional coupler;
   wherein said RF signal measuring device further includes an RF signal compensating circuit which amplifies the reflected RF signal received from the LCR resonant circuit via said first directional coupler and the leaked component of the RF signal part to result in a first signal, and which amplifies and adjusts a phase of the RF signal part received from said 2-way power splitter to result in a second signal; and
   wherein the leaked component of the RF signal part that is amplified and that is contained in the first signal, and the second signal have substantially the same amplitude and are substantially 180 degrees out of phase, said RF signal compensating circuit outputting a compensated reflected RF signal by adding the second signal to the first signal so as to cancel out the leaked component of the RF signal part that is amplified and contained in the first signal.

5. The RF reflectometry scanning tunneling microscope as claimed in claim 4, wherein said RF signal compensating circuit includes:
   a first voltage-controlled gain amplifier which amplifies the reflected RF signal received from the LCR resonant circuit via said first directional coupler and the leaked component of the RF signal part to result in the first signal;

a second voltage-controlled gain amplifier which amplifies the RF signal part received from said 2-way power splitter;

a phase shifter which adjusts the phase of the RF signal part amplified by said second voltage-controlled gain amplifier to result in the second signal, the leaked component of the RF signal part that is amplified and contained in the first signal, and the second signal being substantially 180 degrees out of phase; and a combiner which adds the second signal to the first signal and which outputs the compensated reflected RF signal.

6. The RF reflectometry scanning tunneling microscope as claimed in claim 5, wherein said RF signal compensating circuit further includes a second directional coupler that has a coupling path and that is disposed between said phase shifter and an input terminal of said combiner of said RF signal compensating circuit;

wherein said RF signal measuring device further includes
a third directional coupler that has a coupling path and that is disposed at an output terminal of said combiner,
an amplifier that is coupled electrically to the coupling path of said third directional coupler, and
a phase difference detector that is coupled electrically to an output terminal of said amplifier and the coupling path of said second directional coupler; and wherein said second directional coupler couples the second signal to said phase difference detector, said third directional coupler coupling the compensated reflected RF signal outputted by said combiner to said amplifier, said amplifier amplifying the compensated reflected RF signal received from said third directional coupler to result in the third signal, and outputting the third signal to said phase difference detector, said phase difference detector detecting a phase difference between the second signal and the third signal.

7. The RF reflectometry scanning tunneling microscope as claimed in claim 4, wherein said RF signal measuring device further includes:

an RF power detector which detects magnitude of power of the compensated reflected RF signal outputted by said RF signal compensating circuit;

a scanning controller which controls said probe based on the magnitude of power of the compensated reflected RF signal detected by said RF power detector; and a computer which generates the scanning result associated with the surface of the object based on the magnitude of power of the compensated reflected RF signal detected by said RF power detector.

8. The RF reflectometry scanning tunneling microscope as claimed in claim 7, further comprising:

a bias tee circuit coupled electrically to said RF resonant circuit and said first directional coupler; and a current-to-voltage converter coupled electrically to said bias tee circuit;

wherein said probe is configured to allow a tunneling current to flow between said probe and the object when a bias voltage is applied between said probe and the object;

wherein the RF signal part passing through said first directional coupler is outputted to the LCR resonant circuit via said bias tee circuit, the reflected RF signal resulting from the LCR resonant circuit is outputted therefrom to said first directional coupler via said bias tee circuit, said RF resonant circuit being configured to output the tunneling current via said bias tee circuit to said current-to-voltage converter which amplifies the tunneling current, converts the tunneling current thus amplified into an output voltage, and outputs the output voltage to said scanning controller, said scanning controller controlling said probe further based on the output voltage.

9. The RF reflectometry scanning tunneling microscope as claimed in claim 8, wherein said probe includes a piezoelectric ceramic crystal which is driven to actuate vibration of said probe; and wherein said scanning controller includes
a first signal processor which processes the output voltage outputted by said current-to-voltage converter,
a second signal processor which processes the magnitude of power of the compensated reflected RF signal detected by said RF power detector,
an adder which outputs a result by adding the output voltage processed by said first signal processor and the magnitude of power of the compensated reflected RF signal processed by said second signal processor, and
an amplifier which amplifies the result outputted by said adder so as to generate a driving signal for driving said piezoelectric ceramic crystal of said probe.

10. The RF reflectometry scanning tunneling microscope as claimed in claim 8, wherein said probe includes a piezoelectric ceramic crystal which is driven to actuate vibration of said probe; and wherein said scanning controller includes
a first signal processor which processes the output voltage outputted by said current-to-voltage converter to result in a processed output voltage,
an amplifier which amplifies the processed output voltage from said first signal processor, and outputs the processed output voltage thus amplified to a first end of said piezoelectric ceramic crystal, and
a second signal processor which processes the magnitude of power of the compensated reflected RF signal detected by said RF power detector, and outputs the magnitude of power of the compensated reflected RF signal thus processed to a second end of said piezoelectric ceramic crystal for driving said piezoelectric ceramic crystal of said probe.

11. The RF reflectometry scanning tunneling microscope as claimed in claim 1, a bias voltage being applied to the object, wherein said probe is grounded and is adapted to cooperate with the object to form the tunneling resistor therebetween as a result of the tunneling effect when said probe is disposed sufficiently close to the object.

12. The RF reflectometry scanning tunneling microscope as claimed in claim 1, the object being grounded, said RF reflectometry scanning tunneling microscope further comprising a high frequency choke coupled electrically to said RF resonant circuit, the LCR resonant circuit being applied with a bias voltage via said high frequency choke, said probe being configured to allow a tunneling current to flow between said probe and the object;

wherein said RF resonant circuit further includes a blocking capacitor connected in series with said resistor for preventing the tunneling current from flowing through said resistor.

13. The RF reflectometry scanning tunneling microscope as claimed in claim 1, further comprising:

a shielding casing configured to house said probe and said RF resonant circuit therein, so as to prevent the reflected RF signal from interference of an external electron/current field.

14. The RF reflectometry scanning tunneling microscope as claimed in claim 13, wherein said shielding casing is formed with an opening configured for extension of a tip of said probe therethrough and outwardly of said shielding casing.

15. The RF reflectometry scanning tunneling microscope as claimed in claim 1, wherein said RF reflectometry scanning tunneling microscope is configured to operate in a constant RF reflection magnitude mode during which said RF signal measuring device utilizes the reflected RF signal for feedback control of said probe, a magnitude of power or a phase of the reflected RF signal being kept constant in the constant RF reflection magnitude mode.

16. The RF reflectometry scanning tunneling microscope as claimed in claim 1, wherein said RF signal measuring device further includes:
   a first input band-pass filter which is coupled electrically to said first input mixer for receiving the first mixed signal therefrom, and which filters out a non-operating frequency sub-signal of the first mixed signal; and
   a second input band-pass filter which is coupled electrically to said second input mixer for receiving the second mixed signal therefrom, and which filters out a non-operating frequency sub-signal of the second mixed signal.

17. The RF reflectometry scanning tunneling microscope as claimed in claim 16, wherein said RF signal measuring device further includes:
   an RF signal compensating circuit which is coupled electrically and respectively to said first input band-pass filter and said second input band-pass filter for receiving the first mixed signal and the second mixed signal, and which subjects the first mixed signal and the second mixed signal to a compensation operation so as to output a compensated reflected RF signal;
   an RF power amplifier which is coupled electrically to said RF signal compensating circuit for receiving the compensated reflected RF signal, and which amplifies the compensated reflected RF signal to result in an amplified compensated signal;
   a band-pass filter which is coupled electrically to said RF power amplifier for receiving the amplified compensated signal, and which filters the amplified compensated signal to result in a filtered compensated signal;
   a 2-way power splitter which is coupled electrically to said band-pass filter for receiving the filtered compensated signal, and which splits the filtered compensated signal into a first split signal and a second split signal;
   an RF power detector which is coupled electrically to said 2-way power splitter for detecting a magnitude of power of the first split signal;
   a scanning controller which is coupled electrically to said RF power detector for receiving the magnitude of power of the first split signal detected thereby, and which controls said probe based on the magnitude of power of the first split signal; and
   a computer which is coupled electrically to said RF power detector, and which generates the scanning result associated with the surface of the object based on the magnitude of power of the first split signal.

18. The RF reflectometry scanning tunneling microscope as claimed in claim 17, wherein said RF signal measuring device further includes:
   a third directional coupler which is coupled electrically between said band-pass filter and said 2-way power splitter;
   an amplifier which is coupled electrically to said third directional coupler that couples the filtered compensated signal outputted by said band-pass filter to said amplifier, said amplifier amplifying the filtered compensated signal received from said third directional coupler to result in an amplified coupled signal; and
   a phase difference detector which is coupled electrically to an output terminal of said amplifier and said RF signal compensating circuit, said phase difference detector detecting a phase difference between a phase-shifted signal that is associated with the first mixed signal and that is outputted by said RF signal compensating circuit, and the amplified coupled signal outputted by said amplifier.

19. The RF reflectometry scanning tunneling microscope as claimed in claim 18, wherein said computer further obtains the scanning result of the surface of the object based on variation of the phase difference detected by said phase difference detector.

* * * * *